United States Patent
Vos et al.

(10) Patent No.: US 8,228,848 B2
(45) Date of Patent: Jul. 24, 2012

(54) METHOD AND APPARATUS FOR FACILITATING PUSH COMMUNICATION ACROSS A NETWORK BOUNDARY

(75) Inventors: Gustav Gerald Vos, Surrey (CA); Steven Lawrence Gielty, Coquitlam (CA)

(73) Assignee: Sierra Wireless, Inc., Richmond, British Columbia (CA)

( * ) Notice: Subject to any disclaimer, the term of this patent is extended or adjusted under 35 U.S.C. 154(b) by 213 days.

(21) Appl. No.: 12/620,372

(22) Filed: Nov. 17, 2009

(65) Prior Publication Data

US 2010/0124191 A1    May 20, 2010

Related U.S. Application Data

(63) Continuation-in-part of application No. 12/370,421, filed on Feb. 12, 2009.

(60) Provisional application No. 61/258,002, filed on Nov. 4, 2009, provisional application No. 61/115,412, filed on Nov. 17, 2008.

(51) Int. Cl.
*H04Q 7/00* (2006.01)
*H04L 12/28* (2006.01)
*H04L 12/56* (2006.01)
*G06F 15/16* (2006.01)

(52) U.S. Cl. ............ 370/328; 370/389; 709/227
(58) Field of Classification Search .......... None
See application file for complete search history.

(56) References Cited

U.S. PATENT DOCUMENTS

| | | | |
|---|---|---|---|
| 5,606,668 | A | 2/1997 | Shwed |
| 5,996,021 | A | 11/1999 | Civanlar |
| 6,049,834 | A | 4/2000 | Khabardar |
| 6,058,431 | A | 5/2000 | Srisuresh |
| 6,161,144 | A | 12/2000 | Michels |
| 6,182,185 | B1 | 1/2001 | Stokes |
| 6,363,421 | B2 | 3/2002 | Barker |

(Continued)

FOREIGN PATENT DOCUMENTS

WO    WO 02096128    11/2002

OTHER PUBLICATIONS

Bernard, T., "NAT Port Mapping Protocol (NAT-PMP)", MiniUPnP Project, http://miniupnp.free.fr/, date unknown.

(Continued)

*Primary Examiner* — Robert Scheibel
*Assistant Examiner* — Prenell Jones
(74) *Attorney, Agent, or Firm* — DLA Piper LLP (US)

(57) ABSTRACT

Provided is a method and apparatus for facilitating push communication from a first network to a target device of a second network, the second network comprising a packet service network such as a GPRS core network. A private IP address, usable for addressing the target device when the packet service network is in an activated state with respect thereto, is retained. Upon receipt of a first message from the first network, indicative of a push communication for the target device, the packet service network is disposed into the activated state, and a second message, addressed to the private IP address, is transmitted. The second message may be generated by a NAT configured to implement micro-port forwarding. The second message may be generated by a representative device of the second network, configured to receive the first message via a NAT in response to a query generated by the representative device.

31 Claims, 8 Drawing Sheets

U.S. PATENT DOCUMENTS

| | | |
|---|---|---|
| 6,453,357 B1 | 9/2002 | Crow |
| 6,453,358 B1 | 9/2002 | Michels |
| 6,549,519 B1 | 4/2003 | Michels |
| 6,553,000 B1 | 4/2003 | Ganesh |
| 6,579,663 B2 | 6/2003 | Wolf |
| 6,606,316 B1 | 8/2003 | Albert |
| 6,618,757 B1 | 9/2003 | Babbitt |
| 6,631,416 B2 | 10/2003 | Bendinelli |
| 6,687,252 B1 | 2/2004 | Bertrand |
| 6,711,147 B1 | 3/2004 | Barnes |
| 6,804,707 B1 | 10/2004 | Ronning |
| 6,865,184 B2 | 3/2005 | Thubert |
| 6,944,672 B2 | 9/2005 | Crow |
| 6,954,790 B2 | 10/2005 | Forslöw |
| 6,956,854 B2 | 10/2005 | Ganesh |
| RE38,902 E | 11/2005 | Srisuresh |
| 6,993,595 B1 | 1/2006 | Luptowski |
| 6,996,628 B2 | 2/2006 | Keane |
| 7,023,847 B2 | 4/2006 | Zhang |
| 7,028,333 B2 | 4/2006 | Tuomenoksa |
| 7,031,328 B2 | 4/2006 | Thubert |
| 7,043,564 B1 | 5/2006 | Cook |
| 7,051,116 B1 | 5/2006 | Rodriguez-Val |
| 7,058,973 B1 | 6/2006 | Sultan |
| 7,068,667 B2 | 6/2006 | Foster |
| 7,076,594 B2 | 7/2006 | Benedetto |
| 7,085,854 B2 | 8/2006 | Keane |
| 7,126,948 B2 | 10/2006 | Gooch |
| 7,139,822 B2 | 11/2006 | Guenther |
| 7,139,828 B2 | 11/2006 | Alkhatib |
| 7,159,109 B2 | 1/2007 | Egevang |
| 7,181,766 B2 | 2/2007 | Bendinelli |
| 7,190,696 B1 | 3/2007 | Manur |
| 7,197,661 B1 | 3/2007 | Reynolds |
| 7,215,777 B2 | 5/2007 | Deen |
| 7,237,260 B2 | 6/2007 | Yu |
| 7,245,622 B2 | 7/2007 | Huitema |
| 7,269,663 B2 | 9/2007 | Beier |
| 7,272,650 B2 | 9/2007 | Elgebaly |
| 7,293,108 B2 | 11/2007 | Warrier |
| 7,302,493 B1 | 11/2007 | Alles |
| 7,313,618 B2 | 12/2007 | Braemer |
| 7,333,453 B2 | 2/2008 | Wu |
| 7,340,535 B1 | 3/2008 | Alam |
| 7,356,045 B2 | 4/2008 | Satapati et al. |
| 7,362,760 B2 | 4/2008 | Wang |
| 7,366,188 B2 | 4/2008 | Kim |
| 7,370,194 B2 | 5/2008 | Morais |
| 7,379,475 B2 | 5/2008 | Minami |
| 7,386,641 B2 | 6/2008 | Xu |
| 7,406,534 B2 | 7/2008 | Syvanne |
| 7,411,917 B1 | 8/2008 | Hardie |
| 7,411,975 B1 | 8/2008 | Mohaban |
| 7,441,043 B1 | 10/2008 | Henry |
| 7,443,859 B2 | 10/2008 | Sengodan |
| 7,461,142 B2 | 12/2008 | Wadekar |
| 7,483,999 B2 | 1/2009 | Weyman |
| 7,484,005 B2 | 1/2009 | Rodriguez-Val |
| 7,523,197 B2 | 4/2009 | Castaneda |
| 7,529,810 B2 | 5/2009 | Goto |
| 7,577,746 B2 | 8/2009 | Shima |
| 7,587,209 B2 | 9/2009 | Bianconi |
| 7,587,490 B2 | 9/2009 | Guenther |
| 2002/0107980 A1 | 8/2002 | Kawaguchi |
| 2002/0131395 A1 | 9/2002 | Wang |
| 2002/0138622 A1 | 9/2002 | Dorenbosch |
| 2002/0143773 A1 | 10/2002 | Spicer |
| 2005/0021603 A1 | 1/2005 | Yokomitsu |
| 2005/0027875 A1 | 2/2005 | Deng |
| 2005/0198383 A1 | 9/2005 | Rose |
| 2006/0018283 A1* | 1/2006 | Lewis et al. ............ 370/331 |
| 2006/0190587 A1 | 8/2006 | Sylvest |
| 2007/0268829 A1 | 11/2007 | Corwin |
| 2007/0288613 A1 | 12/2007 | Sudame |
| 2007/0294416 A1 | 12/2007 | Agre |
| 2007/0297430 A1 | 12/2007 | Nykanen |
| 2008/0037534 A1* | 2/2008 | Shina ............ 370/389 |
| 2008/0052395 A1 | 2/2008 | Wright |
| 2008/0225865 A1 | 9/2008 | Herzog |
| 2008/0244260 A1 | 10/2008 | Feldman |
| 2009/0034496 A1 | 2/2009 | Ko |
| 2009/0135765 A1* | 5/2009 | Lewis et al. ............ 370/328 |
| 2011/0252145 A1* | 10/2011 | Lampell et al. ............ 709/227 |

OTHER PUBLICATIONS

Chan et al., "Devices Profiles for Web Services", Microsoft Corporation, Feb. 2006.

Cheshire et al., "NAT Port Mapping Protocol (NAT-PMP)", Internet Engineering Task Force, Internet Draft, Apr. 2008.

Eronen, P., "TCP Wake-Up: Reducing Keep-Alive Traffic in Mobile IPv4 and IPsec Nat Traversal", Nokia Research Center, Jan. 2008.

Goland et al., "Simple Service Discovery Protocol", Internet Engineering Task Force, Internet Draft, Oct. 1999.

Guttman, E., "Zeroconf Host Profile Applicability Statement", Internet Engineering Task Force, Internet Draft, Jul. 2001.

Rekhter et al., "Address Allocation for Private Internets", Internet Engineering Task Force, Request for Comments, No. 1918, Feb. 1996.

Rosenberg et al., Session Traversal Utilities for NAT (STUN), Engineering Task Force, Request for Comments, No. 5389, 2008.

Schlimmer, J., "A Technical Introduction to the Devices Profile for Web Services", Microsoft Corporation, Web Services Technical Articles, May 2004.

Srisuresh and Egevang, "Traditional IP Network Address Translator" (Traditional NAT), Internet Engineering Task Force, Request for Comments, No. 3022, Jan. 2001.

Srisuresh and Holdrege,"IP Network Address Translator (NAT) Terminology and Considerations", Internet Engineering Task Force, Request for Comments, No. 2663, Aug. 1999.

URL, "Universal Plug and Play", Wikipedia entry, http://en.wikipedia.org/w/index.php?title=Universal_Plug_and_Play&oldid=251385724, 2008.

URL, "What is Port Triggering?" http://www.portforward.com/help/porttriggering.htm, author unknown, date unknown.

"WAP Push Architectural Overview", Wireless Application Protocol Forum, Ltd., Version 03, 2001.

* cited by examiner

METHOD AND APPARATUS FOR FACILITATING PUSH COMMUNICATION ACROSS A NETWORK BOUNDARY

CROSS REFERENCE TO RELATED APPLICATION(S)

This application is a continuation-in-part of U.S. patent application Ser. No. 12/370,421 filed Feb. 12, 2009, currently pending, and claims the benefit of priority under 35 U.S.C. §119(e) of U.S. Patent Application No. 61/258,002 filed Nov. 4, 2009 and U.S. Patent Application No. 61/115,412 filed Nov. 17, 2008.

FIELD OF THE INVENTION

The present invention pertains in general to communication networks and in particular to a method and apparatus for facilitating communication of push data across a network boundary between a first network and a second network.

BACKGROUND

Packet switched networks such as Internet Protocol (IP) networks are widely used for communication. For example, packet switched networks are well-suited to delivering messages such as emails or other messages from a device in a public network, such as the Internet, to a target device, such as a mobile device or user equipment in a cellular, wireless, or private network.

One approach for facilitating packet switched communications in networks, such as cellular networks, involves General Packet Radio Service (GPRS). GPRS is a service facilitating communication between mobile devices in a cellular network, such as a GSM network, and devices accessible via a public IP-based network, such as the Internet. GPRS includes a GPRS core network which operates as an intermediate service network between the public IP-based network and the cellular network.

In some instances, it is desirable to use GPRS to communicate data from a server in the public network to a specified target device in the cellular network, without the target device having to specifically request the data. For example, it may be desirable to have the server substantially initiate a communication with the target device to send information related to an event, such as receipt of an email, an instant message, an online auction event, or the like. Such a communication is referred to herein as a push communication. Push communication may desirably reduce overhead in the network, since the target devices may not be required to periodically poll the server to retrieve pending messages held in the server.

One approach to providing push communication to devices in a cellular network, operatively coupled to a public network via a service network such as a GPRS core network, is to assign a public IP address to each potential target device in a cellular network. Each target device is thereby effectively made part of the public network. IP address assignments are made in response to an initial Packet Data Protocol (PDP) context activation initiated by the target device. A PDP context activation is an operation associated with GPRS which establishes an association between the target device and an IP address for use thereby. After a public IP address is assigned to the target device, it remains assigned to that device for at least a predetermined period of time, even if the target device subsequently performs a PDP context deactivation. Public IP address assignments may be configured to persist for a long period of time, for example days or weeks. Therefore, subsequent PDP context activations, occurring before expiry of the public IP address assignment, will re-establish the previous association between public IP address and target device. For push communications, the GPRS core network is configured to initiate a subsequent PDP context activation upon receipt of one or more packets addressed to the public IP address, if an appropriate PDP context is not currently active.

The above-described approach for providing push communications to a target device previously associated with a public IP address is illustrated in FIG. 1, and described as follows. Upon initiation of a push communication from a server 110 to a target device 130, the server 110 transmits one or more IP packets 115, each having an IP address corresponding to a public IP address previously assigned to the target device 130 during initial setup. The Gateway GPRS Support Node (GGSN) 120 receives the IP packets 115 and forwards them to the target device 130, via an appropriate Serving GPRS Support Node (SGSN) 125 and other appropriate network equipment, such as a cellular base station. If a PDP context is not activated for the target device, the GGSN initiates a PDP context activation for the target device, using the previously assigned public IP address.

However, since public IP addresses are a limited resource, it may not be feasible to support push communication for a large number of target devices in this manner at the same time.

Therefore there is a need for a method and apparatus for facilitating push communication across a network boundary that is not subject to one or more limitations in the art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for facilitating push communication across a network boundary. In accordance with an aspect of the present invention, there is provided a method for facilitating push communication from a first network to a target device associated with a second network, the second network comprising a packet service network, the method comprising the steps of: retaining a private address for the target device, the private address usable for facilitating communication with the target device from within the second network when the packet service network is disposed in an activated state with respect to the target device; and upon receipt of a first message from the first network: determining if the first message is indicative of a push communication from the first network to the target device; and if the first message is determined to be indicative of the push communication from the first network to the target device: initiating an activation operation associated with the packet service network, the activation operation configured to dispose the packet service network into the activated state with respect to the target device; creating, based on the first message, a second message indicative of the push communication to the target device, the second message addressed to the private address; and transmitting the second message from within the second network.

In accordance with another aspect of the present invention, there is provided an apparatus for facilitating push communication from a first network to a target device associated with a second network, the second network comprising a packet service network, the apparatus comprising: one or more memory modules configured to retain a private address for the target device, the private address usable for facilitating communication with the target device from within the second network when the packet service network is disposed in an activated state with respect to the target device; and an interface module operatively coupled to at least one of the one or more memory modules, the interface module comprising one or more network interfaces configured to communicatively couple the interface module to one or more of the first network and the second network, and a processing module operatively coupled to at least one of the one or more network interfaces, the interface module configured to: receive, using one of the one or more network interfaces, a first message from the first network; determine, using the processing module, if the first message is indicative of a push communication from the first network to the target device; and if the first message is determined to be indicative of the push communication from the first network to the target device: initiate, using one of the one or more network interfaces, an activation operation associated with the packet service network, the activation operation configured to dispose the packet service network into the activated state with respect to the target device; create, using the processing module, a second message based on the first message, the second message indicative of the push communication to the target device, the second message addressed to the private address; and transmit the second message using one of the one or more network interfaces.

In accordance with another aspect of the present invention, there is provided a computer program product comprising a memory having embodied thereon statements and instructions for execution by a computer, thereby causing the computer to perform a method for facilitating push communication from a first network to a target device associated with a second network, the second network comprising a packet service network, the method comprising the steps of: retaining a private address for the target device, the private address usable for facilitating communication with the target device from within the second network when the packet service network is disposed in an activated state with respect to the target device; and upon receipt of a first message from the first network: determining if the first message is indicative of a push communication from the first network to the target device; and if the first message is determined to be indicative of the push communication from the first network to the target device: initiating an activation operation associated with the packet service network, the activation operation configured to dispose the packet service network into the activated state with respect to the target device; creating, based on the first message, a second message indicative of the push communication to the target device, the second message addressed to the private address; and transmitting the second message from within the second network.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
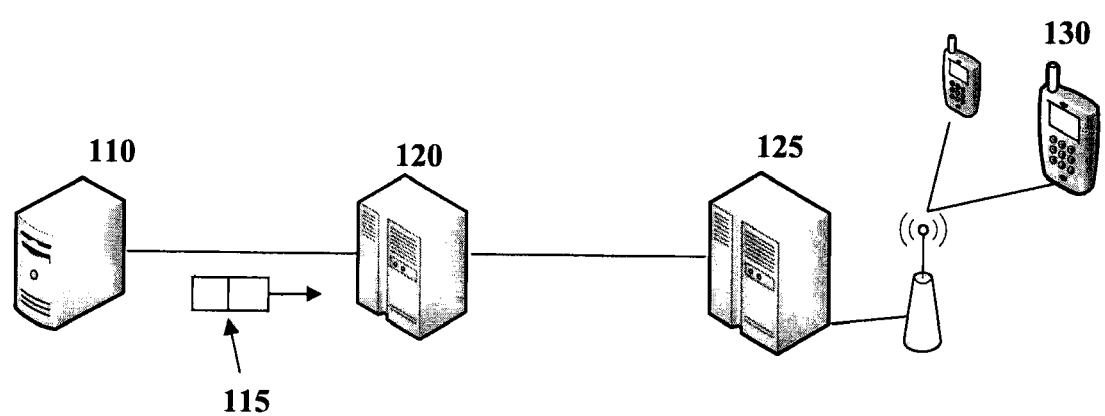
FIG. 1 illustrates push communication from a server in a public network to a device in a GPRS-enabled network in accordance with the prior art.

The term "push communication" refers to a communication between a first networked device, such as a server, and a second networked device, such as a mobile device or user equipment, wherein the communication is substantially initiated by one or more devices other than the second networked device. For example, if the first networked device can initiate a connection to the second device unaided, the first networked device may initiate push communication. If the first networked device requires assistance of one or more other devices to initiate a connection to the second networked device, the first networked device and other device(s) can operate together to initiate push communication.

The term "push data" refers to data, such as one or more packets, communicated from a first networked device to a second networked device in accordance with push communication.

The term "public network" refers to a network of communication devices, wherein communication with each device of the public network is substantially unmediated. An example of a public network is the set of communicatively coupled IP network nodes having publically routable IP addresses.

The term "private network" refers to a network of communication devices, wherein communication between a device outside the private network, to a device inside the private network is subject to mediation by an intermediate device. An example of a private network is a set of IP network devices communicatively coupled to another network via a NAT or firewall.

The term "GPRS-enabled network" refers to a network comprising a GPRS core network. The GPRS core network comprises a gateway such as a GGSN, and may facilitate operative coupling between devices of the network and devices operatively coupled to the gateway.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for facilitating push communication from a first network to a target device in a second network. The first network may be a public network such as the Internet, for example, and the device of the first network may be a server or other networked device. The second network may be a cellular network, private network containing a cellular, wired or wireless network, or the like. The target device may be a mobile device, cellular telephone, machine-type-communication (MTC) device, mobile user equipment (UE), or the like. The second network may comprise a packet service network, such as a GPRS core network, configured to communicatively couple devices of the first network and devices of the second network. For example, the second network may be a GPRS-enabled network maintained by a cellular service provider.

The packet service network of the second network may be associated with an activation operation, such as a PDP context activation operation, for disposing the packet service network into an activated state with respect to a specified target device of the second network. In the activated state, the packet service network is configured to facilitate communication with the target device, for example by associating the target device with an IP address.

In some embodiments, a method for facilitating push communication comprises retaining a private address for the target device, such as a private IP address, the private address usable for facilitating communication with the target device from within the second network when the packet service network thereof is disposed in an activated state with respect to the target device. The method further comprises, upon receipt of a first message from the first network indicative of a push communication from the first network to the target device, initiating an activation operation associated with the packet service network of the second network, the activation operation configured to dispose the packet service network into the activated state with respect to the target device. The method further comprises transforming the first message into a second message indicative of a push communication to the target device, the second message addressed to the private address of the target device and transmitting the second message from within the second network to the target device. A message may be associated with one or more data packets, such as IP packets, the data packets carrying information implicitly or explicitly related to the message.

In some embodiments, an apparatus for facilitating push communication comprises one or more memory modules configured to retain a private address for the target device such as a private IP address, the private address usable for facilitating communication with the target device from within the second network when the packet service network of the second network is disposed in an activated state with respect to the target device. The apparatus further comprises an interface module operatively coupled to at least one of the one or more memory modules. The interface module comprises one or more network interfaces configured to communicatively couple the interface module to both the first network and the second network. The apparatus further comprises a processing module, such as a computer microprocessor or the like. The interface module is configured to receive, using one of the one or more network interfaces, a first message from the first network indicative of a push communication from the first network to the target device. The interface module is further configured to transform, using the processing module, the first message into a second message indicative of a push communication to the target device, the second message addressed to the private address of the target device. The interface module is further configured to initiate, using one of the one or more network interfaces, an activation operation associated with the packet service network of the second network, the activation operation configured to dispose the packet service network into the activated state with respect to the target device. The interface module is further configured to transmit the second message to the target device using one of the one or more network interfaces.

In embodiments of the present invention, a network boundary may separate the first network from the second network, the network boundary comprising a boundary device, such as a NAT. The NAT may be configured to transform and forward data packets, such as data packets comprising or indicative of push data, from the first network to the second network in accordance with a Data Forwarding Rule (DFR). Forwarding of data packets may comprise transformation of the data packets, for example by transforming at least packet identifiers thereof. The NAT may retain one or more DFRs associating identifier information of data packets received by the first network with a private IP address associated with a target device in the second network. The NAT may comprise a first network interface communicatively coupled with the first network, a second network interface communicatively coupled with the second network, a memory, and a processing module for implementing DFRs stored in said memory. In some embodiments, the NAT is an interface module as described herein. In some embodiments, the NAT is communicatively coupled to an interface module, which may be a representative device as described herein. In the latter case, the NAT may be configured to communicatively couple a network interface of the interface module to the first network.

In some embodiments, a DFR may be established automatically in response to a communication from a device in the second network to a device in the first network. The DFR may be configured to facilitate return communication from the device in the first network to the device in the second network. Thus, the boundary device may be configured to substantially pass incoming communication from the first network to the second network only if said incoming communication is in response to a corresponding outgoing communication from the second network to the first network. A DFR may be configured to persist for at least a predetermined period of time after its establishment. In some embodiments, a DFR may be renewed periodically, for example in response to communication from the device in the second network associated with the DFR to the device in the first network associated with the DFR.

In some embodiments, a private IP address may be assigned to a target device in the second network, for example prior to or concurrently with establishing a DFR. The private IP address may be assigned by a DHCP server, in response to an activation operation associated with the service network, such as a PDP context activation operation associated with a GPRS core network, or a combination thereof. The DHCP server may lease the private IP address for use by a target device for at least a predetermined period of time. In some embodiments, the DHCP lease may be configured to persist for at least as long as the DFR. In some embodiments, the DHCP lease may be configured to persist after the DFR expires, after a deactivation operation associated with the service network to dispose the service network in an unactivated state with respect to the target device, such as a PDP context deactivation, or both. In some embodiments, the DHCP lease may be renewed by periodically performing an activation operation by the target device of the second network or by a device acting on behalf thereof, before expiry of the lease, thereby extending the lease to facilitate persistence of an established association between the target device and the private IP address. In some embodiments, the private IP address assignment may be renewed by periodically contacting the DHCP server to renew a lease of the private IP address assignment. In embodiments of the invention, the DHCP server may retain the private IP address associated with a target device of the second network in accordance with a DHCP lease, such that subsequent activation operations associated with the target device will result in the same private IP address being assigned thereto.

Embodiments of the present invention are configured to initiate an activation operation, such as a PDP context activation, in response to receipt of a push communication or communication comprising a notification thereof. The activation operation is configured to dispose the packet service network of the second network, such as a GPRS core network, into a state facilitating forwarding of one or more data packets to a target device associated with the second destination address. For example, a PDP context activation may involve associating a private IP address with a target device or identifier thereof, thereby enabling the target device to transmit and/or receive packet-based communications within at least the second network. In various embodiments of the invention, activation operations may be initiated by one or more various devices or modules, such as interface modules, GGSNs, boundary devices, representative devices, target devices, and the like.

Embodiments of the present invention may involve facilitating push communication from a first network to a target device associated with a second network, the second network comprising a packet service network, by utilizing micro-port forwarding, communication of push communication notifications via a representative device, or a combination thereof, as described herein. As used herein, the term "micro-port forwarding" refers to transforming and forwarding packets between a first network and a second network, via a NAT or other boundary device, the transforming and forwarding comprising, for an incoming packet from the first network: determining a source address, source port number and destination port number of the incoming packet; transforming the incoming packet into one or more outgoing packets, each outgoing packet having a destination address determined based on at least the source address, source port number and destination port number of the incoming packet; and forwarding the outgoing packets into the second network.

Embodiments of the present invention may involve sharing or multiplexing of limited resources of a NAT boundary device facilitating push communications. For example, some existing NAT devices may be capable of supporting up to N concurrent connections between the first network and the second network, where N is the number of available port numbers at the NAT. For a 16-bit port number such as used by Transmission Control Protocol (TCP) and User Datagram Protocol (UDP), N is limited to be less than or equal to $2^{16}$. This number may be insufficient for boundary devices coupling large networks. Furthermore, some of these port numbers are reserved for special use, for example port numbers 0 to 1023 have been assigned standard functions by the Internet Assigned Numbers Authority (IRNA). Furthermore, for security purposes, it may be desirable to sparsely utilize port numbers in a NAT.

Embodiments of the present invention may alleviate concurrent port number usage at a NAT boundary device facilitating push communications, by supporting multiple concurrent connections allowing push communications via a single port number, using micro-port forwarding, as described herein.

Embodiments of the present invention may additionally or alternatively alleviate concurrent port number usage at a NAT boundary device facilitating push communications, by configuring a representative device of the second network to transmit notifications of pending push communications, based on data received by the representative device, to target devices of the second network, thereby facilitating using one path through the NAT to initiate push communication to plural potential target devices instead of maintaining a separate path through the NAT for each potential target device.

Embodiments of the present invention may comprise one or more memory modules configured to retain leased private IP addresses for devices of the second network, such as a target device of a push communication. Memory modules may comprise digital computer memory such as RAM, ROM, optical, magnetic or solid-stated memory, or the like. In embodiments of the invention, memory modules may be associated with one or more devices, modules, or nodes, such as DHCP servers, NATs, boundary devices, representative devices, interface modules, GGSNs, or the like. Memory modules of one or more devices such as NATs, boundary devices, representative devices, interface modules, GGSNs, or the like may further be configured to retain information associated with one or more DFRs, such as relationships between public and private IP addresses.

Network Configuration

Figure 2:
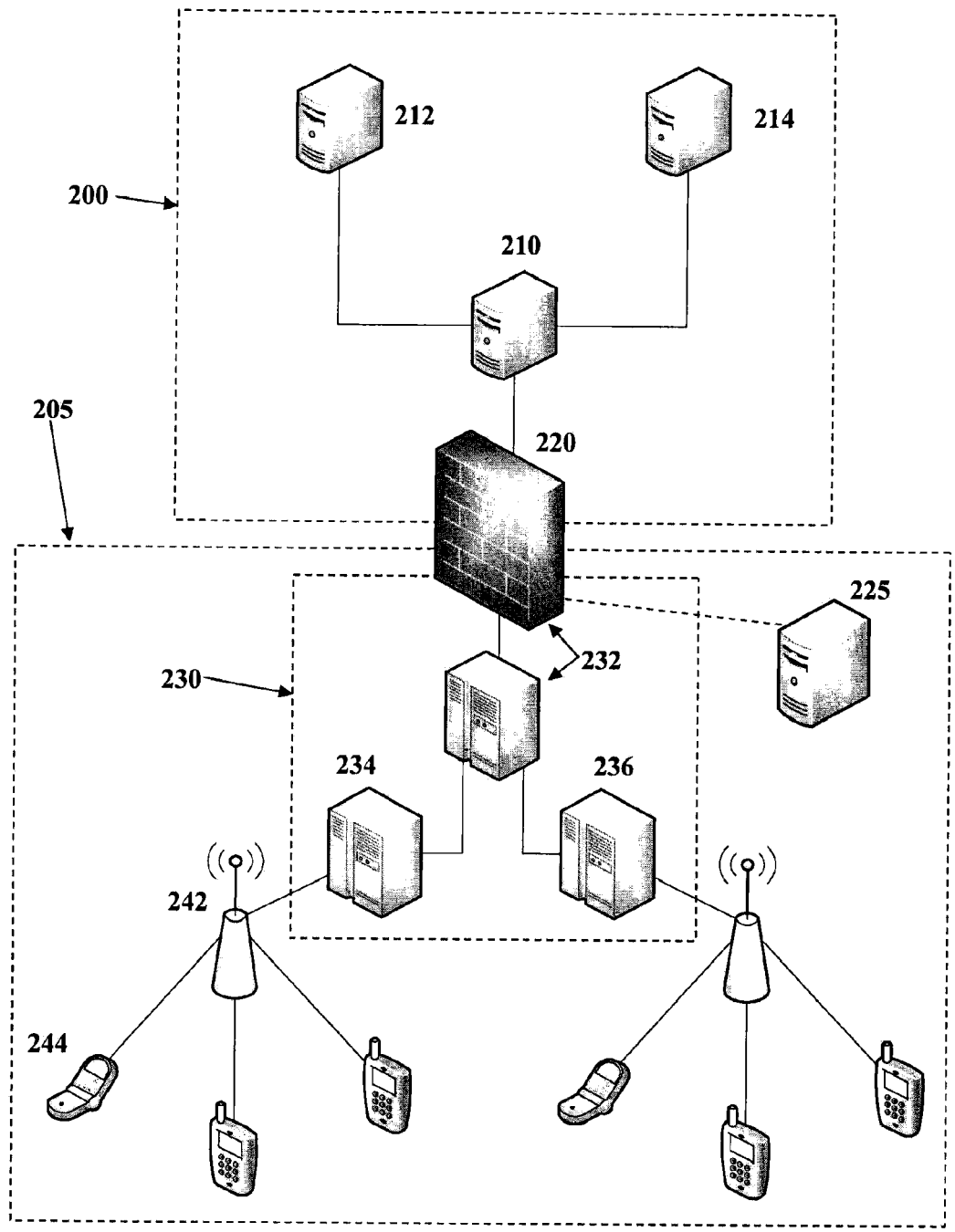
FIG. 2 illustrates a GPRS-enabled network operatively coupled to a public network in accordance with embodiments of the invention.

FIG. 2 illustrates portions of a first network 200 and a second network 205 in accordance with embodiments of the present invention. The first network may be a public network such as the Internet, for example. The second network may be a private network, for example a private network comprising a cellular telephone network operated by a service provider. The first network 200 is communicatively coupled to the second network 205 via a boundary device 220, which may comprise a NAT, DHCP server, firewall, or the like, or a combination thereof. The boundary device 220 may function to render the second network 205 a private network, by mediating communication between the first network 200 and the second network 205 in at least one direction, for example via implementation of one or more DFRs. The boundary device 220 is addressable by both the first network 200 and the second network 205, and in this sense may be considered part of both networks. For this purpose, the boundary device 220 may comprise a first network interface for interfacing with the first network, and a second network interface for interfacing with the second network. In some embodiments, the boundary device 220 may comprise or be operatively coupled to an interface module, as described herein.

The first network 200 comprises a network device 210 such as a server, which may be configured to provide push communication to user equipment in the second network 205. The first network 200 also comprises other devices, such as devices 212 and 214. For example, devices 212 and 214 may be servers providing push data content to device 210.

In the present embodiment, the second network 205 comprises a GPRS core network 230, which includes, for example, a gateway GPRS support node (GGSN) 232, and two serving GPRS support nodes (SGSNs) 234 and 236 communicatively coupled thereto. As illustrated, the GGSN 232 comprises the boundary device 220, for example as an integral or separate device. This arrangement is provided to satisfy the convention that the GGSN is responsible for interworking with the public network 200, and should not be considered limiting to the present invention. Each of the SGSNs 234 and 236 are operatively coupled to other portions of the private network 205. For example, SGSN 234 is communicatively coupled to a base station 242, which is further coupled to user equipment such as a mobile device 244.

It will be understood that the GPRS core network 230 may be replaced with a different type of packet service network configured for operatively coupling the public network with devices of the private network, such as mobile devices in a wireless network.

Additional devices of the first network 200 and/or second network 205 may also be provided to support network functionalities. For example, the second network may include or be operatively coupled to a home location register, visitor location register, mobile switching center, or the like. Furthermore, plural devices may be integrated into a single device, or a network device may be representative of plural physical devices or device functionalities. For example, the base station 242 may perform network management functions as well as communication functions.

In some embodiments, the second network 205 further includes a representative device 225 communicatively coupled to the boundary device 220 or GGSN 232. The representative device 225 may operate, in some embodiments, as an interface module to facilitate push communications from the first network device 210 through the boundary device 220. The representative device 225 may be incorporated into the boundary device 220, the GGSN 232, or the GPRS core network 230. In some embodiments, the representative device 225 may be operatively coupled to the boundary device 220 or GGSN 232 via an SGSN 234 or 236.

Packet Service Network

The packet service network forms at least a portion of the second network and operates to communicate data packets between devices in the first network and devices in the second network. For example, the packet service network may be a GPRS core network, and the second network may be a GPRS-enabled network.

The packet service network may require an activation operation to be performed before communicating data packets between a target device of the second network and the first network. The activation operation disposes the packet service network into a state facilitating forwarding of data packets to or from a target device of the second network. For example, the activation operation may comprise assigning or re-associating a private IP address to a target device of the second network. Associations between device identifiers, such as access point names (APNs) assigned by a network service provider, and private IP addresses may be stored in one or more memory modules, for example associated with a DHCP server and/or one or more other devices, nodes, or modules. For example, if the packet service network is a GPRS core network, the activation operation may comprise a Packet Data Protocol (PDP) context activation operation. The private IP address assignment may be performed in association with a DHCP server, for example by determining an existing private IP address lease for the target device of the second network for which the activation operation is being performed, or by leasing a new private IP address if there is no existing lease associated with the target device.

A packet service network such as a GPRS core network may be configured to support packet-based communications between a device in the first network and a device in the second network as required. For example, a GPRS core network comprises a GGSN communicatively coupled to one or more SGSNs through an internal IP-based network. Packets such as IP packets transmitted between the first network and the one or more target devices, for example mobile devices, are tunnelled through the internal IP-based network between the GGSN and an appropriate SGSN. The GGSN operates as an interface and router to external networks. The GGSN maintains routing information for tunnelling packets to an appropriate SGSN for delivery to the addressed target device. The SGSN is operatively coupled to a base station which is in turn operatively coupled to a plurality of mobile devices. The GGSN and SGSN also collect utilization data for billing purposes. The SGSN is configured to perform authentication and registration of mobile devices for GPRS operation, as well as mobility management.

A mobile device registers with a GPRS network by performing a GPRS attach operation. GPRS attach may facilitate authentication of mobile devices and mobility management. A PDP context activation operation is performed to associate a private IP address with a target device registered with the GPRS network. In some embodiments of the present invention, the PDP context activation operation may be initiated by the mobile device. In some embodiments, a PDP context activation operation for a previously activated device may be initiated by the mobile device, a device of the GPRS core network such as the GGSN, or another device operatively coupled to the GPRS core network.

In embodiments of the present invention, a PDP context activation comprises a Dynamic Host Configuration Protocol (DHCP) request to determine a private IP address to assign to the target device related to the PDP context activation. For example, the DHCP request can be made to a DHCP server associated with or operatively coupled to the NAT boundary device between the first network and second network. The DHCP server, upon receipt of the DHCP request, may determine whether a private IP address is currently under lease to the associated target device, and, if so, return that IP address. Otherwise, a new private IP address may be offered for use by the mobile device. In some embodiments, DHCP leases may be configured to persist for a predetermined amount of time, for example days or weeks, thereby retaining private IP addresses for one or more potential target devices. In some embodiments, a PDP context activation involving a mobile device for which a private IP address is currently leased may initiate a DHCP lease renewal. DHCP is specified, for example, in RFC 2131.

Boundary Device

In embodiments of the present invention, a boundary device may be configured to operatively couple the public network to the private network, and also define the boundary therebetween. The boundary device may comprise a NAT, firewall, gateway, or the like, or a combination thereof The boundary device may initially comprise or be associated with a DHCP server, for example operatively coupled to the NAT. The boundary device may implement port forwarding, narrow port forwarding, micro-port forwarding, or the like. The boundary device may handle messages such as IP-based packets from devices in the first (public) network, such as servers, devices in the second (private) network, such as mobile devices, and other devices, such as one or more representative devices in the second network communicating with the public network on behalf of other devices.

In embodiments of the present invention, the boundary device implements network address translation and/or port translation between the public network and the private network. A NAT may be configured to perform IP address translation, TCP or UDP port translation, or the like. As used herein, a NAT may be a network address and port translation (NAPT) device. Performing network address translation and/or port translation facilitates the use of private IP addresses within the private network. This reduces the need to provide a unique public IP address to multiple devices within the private network, which may be advantageous since public IPv4 addresses are currently limited.

In some embodiments, a NAT may be addressable from the public network by one or more IP addresses, each of which may be used for communication with plural target devices within the private network. The NAT employs translation of network addresses of data packets when they transition a NAT device that connects one network with another, or which connects one part of a network with another. The NAT may receive and retransmit data packets after translating or mapping a source or destination network address thereof. The NAT can map one or more network addresses belonging to a first set of network addresses into a single IP address belonging to a second set of network addresses, so that outbound data packets exiting the NAT device have the same source address as the NAT device. The NAT further uses data forwarding rules (DFRs) stored in translation tables to reverse map destination addresses of inbound data packets back into the first set of network addresses. DFRs are typically generated in response to outbound data packets and are typically only used for a predetermined time for reverse mapping of inbound data packets. A NAT is typically used to connect network nodes that have private IP addresses to a network using public IP addresses. Private and public IP addresses are defined in Y. Rekhter, B. Moskowitz, D. Karrenberg, G. J. de Groot and E. Lear, "Address Allocation for Private Internets," Internet Engineering Task Force, Request for Comments No. 1918, February, 1996. A NAT is described in a number of documents, for example: P. Srisuresh and M. Holdrege, "IP Network Address Translator (NAT) Terminology and Considerations," Internet Engineering Task Force, Request for Comments No. 2663, August, 1999, and P. Srisuresh and K. Egevang, "Traditional IP Network Address Translator (Traditional NAT)," Internet Engineering Task Force, Request for Comments No. 3022, January, 2001.

The NAT facilitates forwarding data packets between two networks, including transformation of data packet information, such as packet identifiers, as appropriate. Each data packet includes an identifier and optionally a data payload. The data payload includes adequately encoded information to be conveyed by the data packet between the source and destination network nodes. The identifier may comprise at least a source network address, destination network address, and a destination port number. The identifier may also comprise a source port number. Transforming and forwarding data packets comprises receiving one or more first data packets from a first network that each includes an identifier, and transforming first data packets that are destined for the second network into second data packets using a number of data-forwarding rules (DFRs). Each second data packet includes an identifier, for example comprising a second source address, a second destination address, a second source port number and a second destination port number. Transforming the first data packets into the second data packets may comprise transforming or reconfiguring packet identifiers, while substantially retaining the packet payloads, and/or spreading payloads of the first data packets over several payloads of the second data packets, or consolidating payloads of the first data packets, or the like, if desired or necessary.

Each data-forwarding rule defines if and how identifiers of data packets to be transformed and forwarded between two networks correlate with each other and how the identifiers are to be mapped when a data packet is reconfigured or transformed and forwarded to the other network. According to an embodiment of the present invention, a data-forwarding rule includes a first identifier associated with a first network, and a second identifier associated with a second network. Each identifier comprises two parts: a source address and source port number corresponding to a source network node, and a destination address and destination port number corresponding to a destination network node.

Data forwarding rules may be configured to map first identifiers to second identifiers. For example, Data forwarding rules according to an embodiment of the present invention may be configured to map the first source address to the second source address, the first source port number to the second source port number, and the first destination port number to the second destination port number.

Different first data packets can have different first source addresses, different first destination addresses, different first source port numbers and/or different first destination port numbers. Different second data packets can have different second source addresses, different second destination addresses, different second source port numbers and/or different second destination port numbers.

In some embodiments, the boundary device comprises a DHCP server. The DHCP server may be configured to assign private IP addresses to devices in the second network in response to a request. For example, an IP address assignment request may be generated as part of an activation operation such as a PDP context activation operation in a GPRS-enabled and/or GPRS core network.

In embodiments of the present invention, private IP address assignments may persist for at least a predetermined period of time, for example until expiry of a corresponding DHCP lease.

In embodiments of the present invention, the DHCP server may be configured to renew leased private IP address assignments in response to one or more trigger events. For example, a DHCP lease may be renewed in response to an activation operation, such as a PDP context activation operation in a GPRS-enabled and/or GPRS core network, by a direct request from a target device in the second network, for example the device holding the lease or a device acting on behalf thereof, or in response to one or more packets transmitted or received by the NAT, said one or more packets addressed to the leased IP address.

In some embodiments, the DHCP server may assign private IP addresses for a predetermined period of time defined relative to statistical or theoretical information regarding the frequency of push communications. For example, the predetermined period of time T may defined as:

$$T = a*1/F_{avg} \tag{1}$$

or, $$T = b*1/F_k \tag{2}$$

where a and b are greater than or equal to one, $F_{avg}$ is the average frequency of push communication events in a statistical sample or theoretical model, and $F_k$ is the frequency below which only a proportion (1−k) of push communication event frequencies in a statistical sample or theoretical model fall, where $0 \leq k \leq 1$, and typically $0.5 \leq k$, for example k=0.8 or k=0.95. Other appropriate definitions of the predetermined period of time T would be readily understood by a worker skilled in the art.

In some embodiments, the boundary device may be incorporated into or otherwise associated with the packet service network of the second network. For example, the boundary device may be incorporated into the GGSN of a GPRS core network. The GGSN may comprise one or more discrete or integrated computing devices such as servers, gateways, NATs, DHCP servers, firewalls, and the like.

Micro-Port Forwarding

In some embodiments, the present invention involves micro-port forwarding, wherein a DFR, for example as implemented by a NAT, is configured to transform and forward incoming first packets from the first network to a private IP address associated with the second network, such that the private IP address is determined by the source address, source port number, and destination port number of the first packets. Data forwarding based upon a source network address and a destination port number that additionally considers a source port number can be used to discriminate inbound and outbound data packets over data forwarding that is based on the source network address and the destination port number alone. The additional consideration of the source port number in port forwarding via NAT, consequently, can be used to increase the number of distinct connections available per source address and destination port. This aspect of the present invention may be referred to as micro-port forwarding and can be employed to improve the number of possible concurrent network connections between network nodes in different packet-switched networks that are connected via an apparatus according to the present invention. Port forwarding and port mapping according to some embodiments of the present invention can also reduce a network node's vulnerability to receive unsolicited data traffic via NAT which in turn can improve resilience against undesired attacks.

In some embodiments, micro-port forwarding can facilitate improved discrimination of incoming packets addressed to a single public address, such as that of a NAT, the incoming packets to be forwarded by the NAT to a private IP address. The incoming packets may be discriminated on the basis of packet identifier information including both the source port number and destination port number.

In some embodiments, a NAT implementing micro-port forwarding is configured as an interface module as described herein. In some embodiments, a NAT implementing micro-port forwarding is communicatively coupled to an interface module as described herein, such as a representative device.

In accordance with an embodiment of the present invention, there is provided a method for facilitating push communication from a first network to a second network, the second network comprising a packet service network. The method comprises retaining a list of one or more Data Forwarding Rules (DFRs). Each DFR has a first portion indicative of a source address, a source port number and a destination port number. The source address, source port number and destination port number associated with the first network. Each DFR also has a second portion indicative of a destination address associated with the second network. The second portion of each DFR is associated with the first portion of the same DFR. The method further comprises receiving a first data packet from the public network, the first data packet comprising a first source address, a first destination address, a first source port number and a first destination port number. The method further comprises determining if the first source address, the first source port number and the first destination port number collectively correspond to the first portion of a DFR in the list.

Upon determining that the first source address, the first source port number and the first destination port number collectively correspond to the first portion of a DFR in the list, the above method further comprises operations facilitating transforming and forwarding information to the second network as follows. A second destination address corresponding to the second portion of the DFR is determined. The first data packet is reconfigured or transformed into one or more second data packets, each second data packet comprising a destination address corresponding to the second destination address. An activation operation associated with the packet service network is initiated, the activation operation configured to dispose the packet service network into a state facilitating forwarding of the one or more second data packets to a device associated with the second destination address. The one or more second data packets are forwarded to the second network.

In accordance with an embodiment of the present invention, there is provided an apparatus for forwarding push data from a first network to a second network, the second network comprising a packet service network. The apparatus comprises a first network interface operatively connected to the first network for receiving one or more first data packets from the first network, the one or more first data packets indicative of push data. Each of the first data packets comprises a first source address, a first source port number and a first destination port number. The apparatus also comprises a processing module operatively connected to the first network interface for receiving the one or more first data packets. The processing module is configured to process the one or more first data packets and to transform each of the first data packets into one or more second data packets if the first source address, the first source port number, and the first destination port number collectively correspond to a stored data-forwarding rule (DFR) stored in a memory operatively coupled to the processing module. The stored DFR further comprising a second destination address associated with the second network, the processing module configured to address each of the second data packets to the second destination address. The apparatus comprises a second network interface operatively connected to the processing module for receiving the one or more second data packets. The second network interface is operatively connected to the second network for sending the one or more second data packets to the second network. The apparatus is configured to initiate an activation operation associated with the packet service network, the activation operation configured to dispose the packet service network into a state facilitating forwarding of the one or more second data packets to a device associated with the second destination address.

Representative Device

In some embodiments, a representative device associated with the second network, or a device configured in part to operate as a representative device, such as a boundary device, is configured to maintain communication with one or more devices in the first network and act as an intermediary for forwarding notifications of pending push communications from devices in the first network to target devices in the second network. The representative device may maintain a two-way communication path through the boundary device through which notification messages of pending push communications may be passed from the first network to the second network. When the representative device receives a notification message indicative of pending push communication for a target device in the second network, it identifies the target device and forwards the notification. Forwarding the notification may comprise transforming at least a portion of the received notification message into one or more data packets for transmitting to the target device. The representative device may also initiate an activation operation associated with a packet service network, such as a PDP context activation operation, to dispose the packet service network into an activated state for facilitating transmission of the notification. The target device may then retrieve pending push communications by transmitting a retrieval request to an appropriate device in the first network. The boundary device is configured to forward responses, containing push communication, to such retrieval requests if they are timely provided.

In some embodiments, use of such a representative device for relaying notifications may facilitate a reduction in network overhead, for example at the boundary device, packet service network, and the like. In some embodiments, since devices in the second network need not maintain an active connection through the packet service network, such as an active PDP context in a GPRS-enabled network, fees associated with usage of the packet service network may be reduced.

In some embodiments, the representative device may operate as an interface module, as described herein. The representative device interface module may comprise a network interface communicatively coupled to the second network, and communicatively coupled to the first network via a boundary device such as a NAT.

In some embodiments, the representative device can be selected from a group of target devices, for example a group of mobile devices, communicatively connected to the second network. In these embodiments, one of the mobile devices is configured as a representative of one or more target devices in the second network. When the mobile device which is configured as a representative device receives a notification message indicative of pending push communication for a target device in the second network, the representative device determines if it is the appropriate representative device and if so it identifies the target device and forwards the notification.

In accordance with an embodiment of the present invention, there is provided a method for facilitating push communication from a first network to a second network. The second network comprises a packet service network. The first network and the second network are communicatively coupled via a boundary device, such as comprising a NAT implementing port forwarding, narrow port forwarding, or micro-port forwarding. The boundary device is configured to pass incoming communication from the first network to the second network only if said incoming communication is in response to a corresponding outgoing communication from the second network to the first network. The method comprises transmitting, for example from a representative device, a query message to a first device. The first device is associated with the first network and is configured to: retain a list indicative of one or more (target) devices associated with the second network for which the first device has registered that push communication is pending; and transmit a query response message in response to the query message transmitted thereto. The query response message comprises an indication of one or more devices associated with the second network for which push communication is pending. The method further comprises receiving the query response message from the first device. The method further comprises determining, in response to the query response message, an address of at least one device indicated in the query response message. The method further comprises initiating an activation operation associated with the packet service network, the activation operation configured to dispose the packet service network into a state facilitating forwarding of the one or more second data packets to a device associated with the second destination address. The method further comprises transmitting a notification message from within the second network to the target device, the target device configured to contact the first device to retrieve pending push communication therefrom in response to the notification message. The notification message may be created by the representative device based on at least a portion of the query response message, for example in accordance with transforming of the query response message.

Query messages and query response messages, and the like, may be communicated via a boundary device such as a NAT. In some embodiments, the query message and query response message may be regarded as the same message on either side of the boundary device, even though the boundary device may be configured to transform packets containing said messages.

In accordance with another aspect of the present invention, there is provided an apparatus, for example a representative device, for facilitating push communication from a first network to a second network. The second network comprises a packet service network. The first network and the second network are communicatively coupled via a boundary device, such as comprising a NAT implementing port forwarding, narrow port forwarding, or micro-port forwarding. The boundary device is configured to pass incoming communication from the first network to the second network only if said incoming communication is in response to a corresponding outgoing communication from the second network to the first network. The apparatus comprises a network interface and a processing module, the network interface communicatively coupled to the second network. The apparatus is configured to transmit, using the network interface, a query message to the first device via the boundary device, the first device associated with the first network. The first device is configured to retain a list indicative of one or more (target) devices associated with the second network for which push communication is pending; and transmit a query response message in response to the query message transmitted thereto. The first network device may be configured to transmit the query response message in a timely manner so as to traverse the boundary device. The query response message comprises an indication of one or more devices associated with the second network for which push communication is pending. The network interface of the apparatus is configured to receive the query response message from the first device via the boundary device and the second network. The apparatus is further configured to determine, using the processing module, an address of a device indicated in the query response message. The apparatus is further configured to initiate, using the network interface, an activation operation associated with the packet service network. The activation operation is configured to dispose the packet service network into a state facilitating forwarding of the one or more second data packets to a device associated with the second destination address. The apparatus is further configured to transmit, using the network interface, a notification message from within the second network to the target device, the target device configured to contact the first device to retrieve pending push communication therefrom in response to the notification message. The notification message may be created by the representative device based on at least a portion of the query response message, for example in accordance with transforming of the query response message.

Querying of the device in the first network, for example by the representative device, may be performed periodically at a predetermined frequency, for example configured to balance latency of push communications with network resource usage. Query frequency may be adjusted dynamically, for example based on push communication traffic levels, the number of target devices in the second network being represented, the number of devices being queried, and the like.

In some embodiments, there need not be any special configuration of the query itself; the device being queried, such as a server in the first network, may be configured to respond to a standard query in accordance with the present invention. As another example, the query can represent a request for a device being queried to forward any indications of messages pending for one or more target devices of the second network represented by the representative device.

In some embodiments, the query can explicitly or implicitly include an indication of a subset of target devices for which an indication of messages pending should be returned. For example, the representative device may include in its query a list of addresses, address masks, or lookup table index, indicating target devices for which the device being queried should return indications of messages pending, if applicable.

In some embodiments, the query can include a schedule restricting the rate of transmission of indications of messages pending to a predetermined maximum. For example, the query can specify a maximum number of indications of messages pending that should be transmitted in response to the query. Such restrictions may be configured so as to reduce the chance of an undesired flood of network activity, for example due to a large number of target devices subsequently retrieving messages from a server. A leaky bucket or token bucket mechanism can optionally be used for this purpose, wherein the implementation of a leaky bucket or token bucket would be readily understood by a worker skilled in the art.

In some embodiments, the query response can include an indication of a subset of target devices in the second network for which push communications are pending. For example, an encoded or unencoded list, address mask, or the like can be transmitted in the query response, indicating all or a portion of target devices of the first set of networked devices for which one or more push communications are pending.

In some embodiments, the pending push communications, or copies thereof, may be stored at device in the first network queried by the representative device. This device, such as a server, may be configured to respond to the query by performing a look-up operation to check for pending push communications intended for target devices represented by the representative device, and to package and send indications of one or more such pending push communications if pending push communications are found. The look-up operation may be parameterized by factors such as the address of the representative device, contents of the query such as limitations on the number of messages and/or indications of devices for which indications should be sent, and/or other factors.

In some embodiments, portions of pending messages, or indicators based on message content, can be sent with the query response. In this manner, target devices receiving a notification of pending messages can determine or schedule retrieval of said messages based on an indication of content. For example, more urgent messages may be retrieved immediately, while less urgent messages may be retrieved later or not at all.

In some embodiments, the query response can implicitly or explicitly include other feedback for use in configuring the generation of future queries. For example, if there are no messages pending, an implicit or explicit notification can be transmitted to the representative device, which may result for example in a reduction in frequency of future queries. Other methods of feedback may also be implemented. For example, the number of pending messages residing at the second networked device at the time of each query may be used to adjust the frequency or scheduling of future queries.

A query response message, received by the representative device, comprises an indication of one or more target devices associated with the second network for which push communication is pending. For example, each target device may be identified by a private IP address or other unique identifier associated with the device.

In some embodiments, a target device indicated in a query response message may be identified by an indication of packet identifier information that would be used to traverse the boundary device to contact the target device if or when a previously established DFR associated with the device is or was active.

For example, after a DFR associated with the target device is configured at the boundary device, the server may receive one or more packets from the target device, via the boundary device. These incoming packets will contain identifier information, such as an incoming packet source address, incoming packet destination address, incoming packet source port number, and incoming packet destination port number. As would be readily understood by a worker skilled in the art, the server may then determine appropriate identifier information to include in response packets for responding to the incoming packets. For example, the response packets would typically include response identifier information comprising a source address equal to the incoming packet destination address, destination address equal to the incoming packet source address, source port number equal to the incoming packet destination port number, and destination port number equal to the incoming packet source port number. The server may then store the response identifier information. Subsequently, the server may use the response identifier information to indicate the target device in a query response message. Upon receipt of the query response message, the representative device may determine a private IP address corresponding to the packet identifier information indicated by the server. The representative device may retain a copy of the DFRs currently in use for this purpose. Alternatively, the representative device may be operatively coupled to a NAT and capable of searching through the list of DFRs stored thereon for this purpose.

In some embodiments, a target device indicated in a query response message may be identified by an indication of a private IP address associated with the second network containing the target device. For example, after a device obtains a DHCP lease for a private IP address, the target device may transmit its private IP address to a server in the first network, registering its private IP address with the server. The server is configured to respond to queries from the representative device to indicate notifications of pending messages for identified target devices, as described herein. When a query response from the server to the representative device contains such an indication, the target device is identified using the provided private IP address. The representative device may then initiate an activation operation to activate the packet service network to service the indicated private IP address. The representative device may then transmit a notification to the target device. The target device may respond by contacting the server, and the server may reply with the pending push communication. The notification message may be configured to initiate a predetermined push message retrieval routine at the target device, and may comprise an indication of an address of the server to be contacted, along with other information such as server port number, if required. For example, the notification message may contain, in its payload, an indication of the server address along with a message prompting the target device to initiate the retrieval routine. As another example, the notification message may represent a spoofed communication from the server which prompts the target device to contact the server.

An apparatus according to embodiments of the present invention may be a specialized device or a modified NAT device, routing device, firewall device, gateway, server, boundary device, representative device, or the like, or a combination thereof. The apparatus may comprise or be operatively coupled to a DHCP server. The apparatus may also be associated with one or more networked devices. For example, the apparatus may be a distributed apparatus associated with one or more devices operatively coupled via a network and/or via direct communication. The apparatus may comprise one or more network interfaces operatively coupled to one or more processors, as well as memory, software, firmware, a power source, other hardware, and/or the like, configured together to implement DFRs or like operations in accordance with the present invention.

The invention will now be described with reference to specific examples. It will be understood that the following examples are intended to describe embodiments of the invention and are not intended to limit the invention in any way.

EXAMPLES

Example 1

Figure 3:
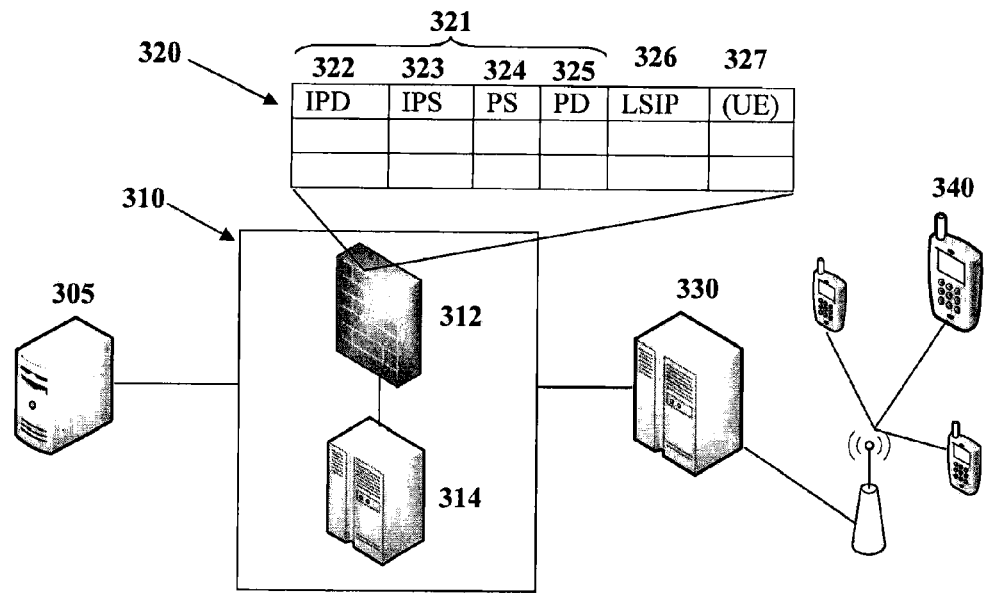
FIG. 3 illustrates a portion of a public network communicatively coupled to a portion of a private network via a GPRS core network in accordance with embodiments of the invention.

FIG. 3 illustrates a portion of a public network communicatively coupled to a portion of a private network via a GPRS core network in accordance with an embodiment of the present invention via micro-port forwarding. The public network comprises a server 305 having pending push data for a target mobile device or machine type communication (MTC) user equipment (UE) 340 of the private network. The GPRS core network comprises a GGSN 310, which includes a NAT 312 and a DHCP server 314.

The DHCP server 314 is configured to assign private IP addresses to devices in the private network, such as UE 340, in response to a PDP context activation request. Private IP addresses may be leased for a predetermined period of time and retained at least in a memory module of the DHCP server. The IP address lease for a device may be renewable by performing a subsequent PDP context activation associated with the same device within a predetermined time period, for example minutes, hours, days, or weeks. The IP address lease for a device may be configured to persist even if a PDP context for that device is deactivated. In this manner, private IP addresses may be persistent in time. In some embodiments, the DHCP server maintains a record of assigned private IP addresses associated with various user equipment, the user equipment identified by a substantially static user equipment identifier, such as an access point name (APN).

The NAT 312 is configured to facilitate transforming and forwarding data between the public network and the private network in accordance with one or more data forwarding rules (DFRs) stored therein. The NAT 312 may be configured as an interface module and/or in accordance with micro-port forwarding, as described herein. For example, the NAT may maintain, stored in memory, a table 320 associating packet identifier information 321 associated with packets of the public network, with packet identifier information associated with the private network. Each row of table 320 corresponds to a DFR. Stored packet identifier information 321 associated with the public network comprises a destination IP address (IPD) 322, source IP address (IPS) 323, source port number (PS) 324, and destination port number (PD). Stored packet identifier information associated with the private network comprises a local static IP address (LSIP) 326. In some embodiments, a substantially static user equipment identifier (UE) 327, such as an access point name (APN), or the like, may also be associated with a DFR. In some embodiments, the table 320, may be encoded or implemented as a hash table, data processing routine, or the like.

When passing incoming data packets from the public network to the private network, the NAT is configured to first determine if packet identifier information, including source IP address, source port number, and destination port number, of the incoming data packets matches a stored packet identifier entry 321 in table 320. If a match is found, the NAT forwards the incoming data packets to the second network, transforming said packets at least by replacing the destination address with the associated LSIP of the stored entry. Microport forwarding may be implemented by associating the combination of source IP address, source port number and destination port number with a corresponding LSIP in accordance with a stored DFR. The NAT may also function to pass data from the private network to the public network by reverse mapping in accordance with stored DFRs. In some embodiments, a DFR may be generated automatically in response to a packet passing from the private network to the public network, if a DFR associated with the private network address is not already established.

The GPRS core network further comprises a SGSN 330, operatively coupled to the GGSN 310 and a wireless network containing the target UE 340. The target UE is associated with a particular SGSN 330 and may move between SGSNs, as would be readily understood by a worker skilled in the art.

Example 2

Figure 4:
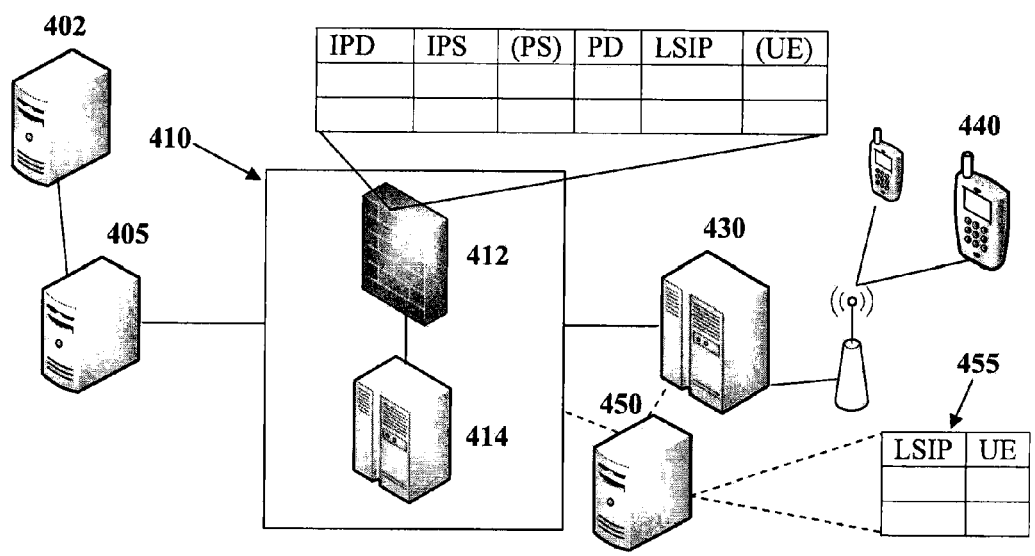
FIG. 4 illustrates a portion of a public network communicatively coupled to a portion of a private network via a GPRS core network in accordance with embodiments of the invention.

FIG. 4 illustrates a portion of a public network communicatively coupled to a portion of a private network via a GPRS core network in accordance with an embodiment of the present invention, incorporating a representative device 450 of the private network. The public network comprises a server 405 having pending push data for a target mobile device user equipment (UE) 440 of the private network. The GPRS core network comprises a GGSN 410, which includes a NAT 412 and a DHCP server 414.

The DHCP server 414 and the NAT 412 may function similarly to those described with respect to FIG. 3. However, the NAT 412 need not be configured to implement micro-port forwarding.

The representative device 450 is configured to periodically communicate with the server 405. The representative device 450 may be incorporated into or operatively coupled to the GGSN 410, either directly or via an SGSN such as SGSN 430. The representative device may utilize an active PDP context, DFR, IP address lease, or the like, as appropriate. The representative device 450 may be configured as an interface module, as described herein. The representative device 450 is configured, in response to the server 405 transmitting to the representative device 450 an indication of one or more devices of the private network for which push communications are pending, to determine an address of one or more devices indicated by the server, initiate one or more PDP context activation operations associated with those devices or addresses thereof, and transmit notifications thereto. In some embodiments, the representative device 450 may contain, for example in a memory module thereof, a full or partial table 455 of DHCP IP address assignments and/or DFRs, or a combination thereof, to facilitate identification and determination of addresses of devices for which push communications are pending. In some embodiments, the representative device 450 may be operatively coupled to the DHCP server 414 and/or NAT 412 to retrieve information therefrom to facilitate identification and determination of addresses of devices for which push communications are pending.

In some embodiments, the server 405 is configured to cooperate with the representative device 450. For example, the server 405 may be configured to respond to query messages received from the representative device 450 with a query response message comprising an indication of one or more devices of the second network for which push communication is pending. The server 405 may receive and store push communications, or notifications thereof, from other servers of the public network coupled thereto, such as server 402. For example, if a push communication is pending for UE 440, the query response message may contain a message comprising the private IP address last assigned to UE 440, the public IP address associated with said private IP address in a stored DFR, or another identifier associated with UE 440, such as its APN. The server 405 is configured to respond to a query of the representative device 405 in a timely manner, such that the NAT will identify the query response as a reply to a previous outgoing message, and forward the query response to the representative device via a DFR. The representative device may be configured to initiate a PDP context activation associated with a private IP address associated with UE 440, and notify UE 440 of a pending push communication, for example by transmitting messages thereto based on a query response from the server 405. UE 440 may contact the server 405 or another appropriate server to retrieve the pending push communication.

The GPRS core network further comprises a SGSN 430, operatively coupled to the GGSN 410 and a wireless network containing the target UE 440. The target UE is associated with a particular SGSN and may move between SGSNs, as would be readily understood by a worker skilled in the art.

Example 3

Figure 5:
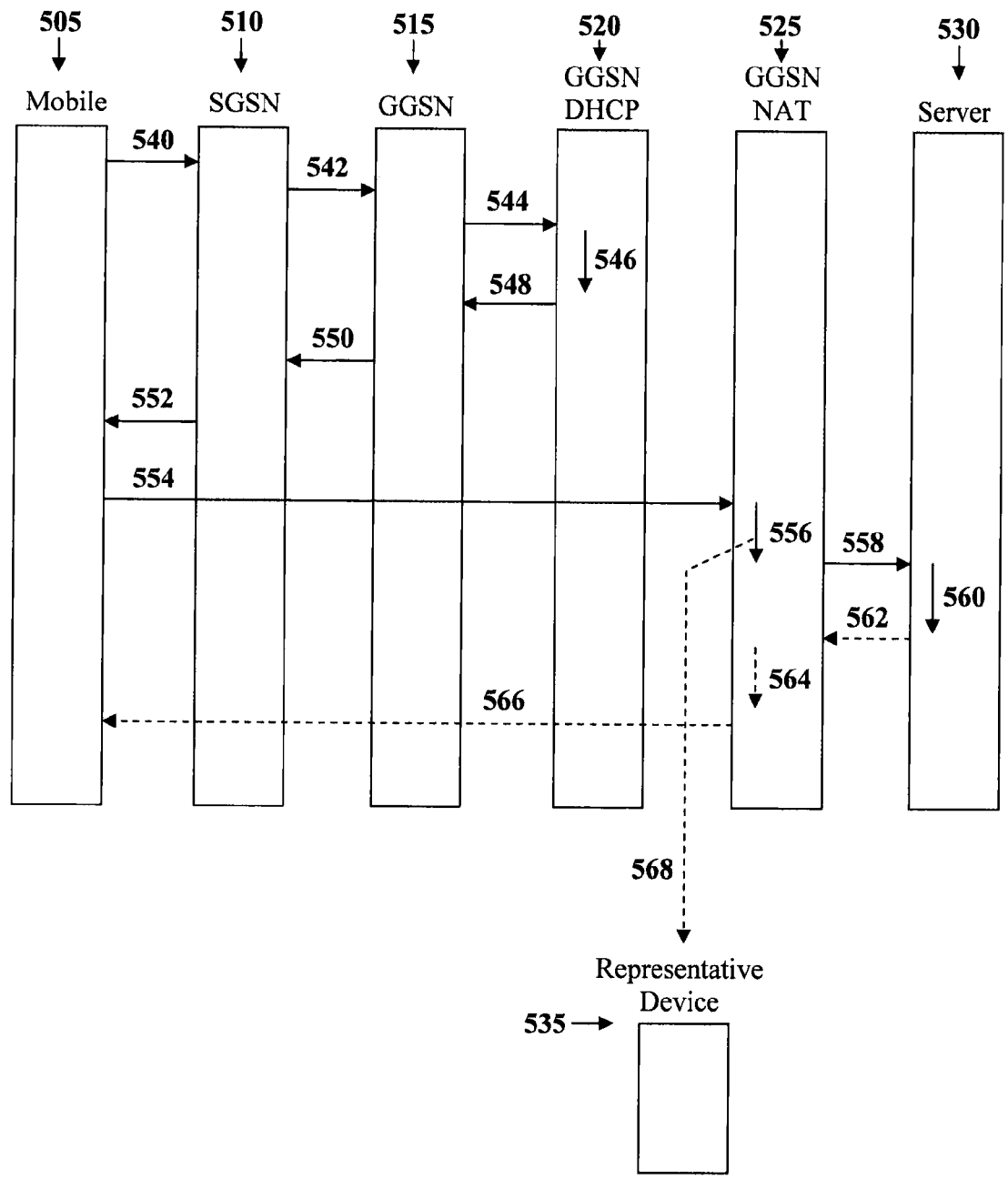
FIG. 5 illustrates a sequence diagram for performing an initial PDP context activation and optional server registration in accordance with embodiments of the invention.

FIG. 5 illustrates a sequence diagram for performing an initial PDP context activation and optional server registration in accordance with embodiments of the present invention, for example associated with the networks illustrated in FIGS. 2, 3 and 4. An initial PDP context activation may be required before push communications can be provided to a mobile device, even if the PDP context is immediately deactivated after initial activation. It is assumed that a GPRS attach operation has already been performed by the mobile device, as would be readily understood by a worker skilled in the art. As illustrated in FIG. 5, the mobile device 505 transmits an Activate PDP context message 540 to an associated SGSN 510. The message 540 may comprise an identifier of the mobile device 505, such as an access point name (APN) or the like. The SGSN 510 may perform a DNS query (not shown) to determine an appropriate GGSN 515 corresponding to the mobile device. The SGSN then transmits a create PDP context request message 542 to the GGSN, which may for example comprise a copy of message 540. The GGSN may authenticate the GPRS subscription and transmit a request 544 for an IP address to a DHCP server 520. The DHCP server determines 546, using the mobile device 505 identifier, whether a private IP address is currently under lease to the mobile device. If so, the DHCP server returns this IP address in a response 548 to the GGSN 515. The DHCP server 520 may further be configured to renew the IP address lease in this case. Otherwise, a new private IP address is leased to the mobile device and provide in the response 548. The GGSN 515 then responds 550 to the SGSN 510, indicating completion of the PDP context activation procedure. The SGSN 510 further replies 552 to the mobile device 505 to signal completion.

In some embodiments, after completion of the PDP context activation, the mobile device 505 may transmit 554 one or more data packets, addressed to server 530, to NAT 525. The NAT may respond by establishing 556 a DFR and transforming and forwarding 558 the data packets to the server. In some embodiments, details of the DFR may be transmitted 568 to a representative device 535 in the second network, such as the representative device 225 of FIG. 2, or 450 of FIG. 4. If desired, the server 530 may process 560 and respond to the message 558, by transmitting a message 562 to the NAT 525, which may be processed 564 in accordance with the DFR and forwarded 566 to the mobile device 505.

Example 4

Figure 6:
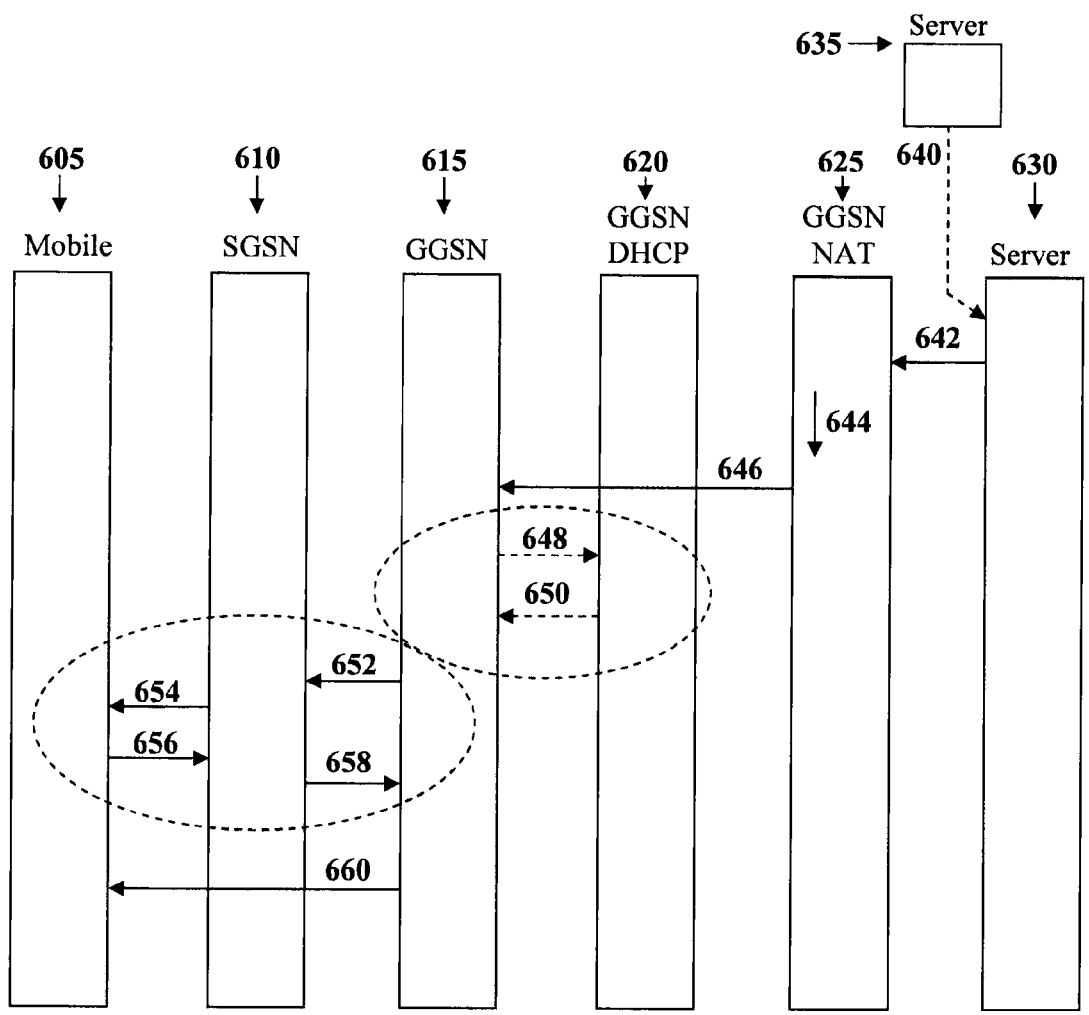
FIG. 6 illustrates a sequence diagram for providing push communication from a server to a mobile device, in accordance with embodiments of the invention.

FIG. 6 illustrates a sequence diagram for providing push communication from a server 630 to a target mobile device 605, in accordance with an embodiment of the present invention, for example using micro-port forwarding. For example, the devices in the illustrated sequence diagram may relate to the network illustrated in FIG. 3. It is assumed that the target mobile device 605 has previously obtained a private IP address and registered with the server 630, for example in accordance with the sequence diagram illustrated in FIG. 5. The push data may optionally be provided 640 to server 630 by another server 635. Upon obtaining the push data, the server 630 transmits 642 one or more packets containing or otherwise indicative of push communication to the NAT 625 associated with a GGSN. A processing module of the NAT is configured to determine 644, for example in accordance with micro-port forwarding, a DFR corresponding to identifiers of the received packets, if available. If an appropriate DFR is determined, for example by matching source IP address, source port number, and destination port number of the received packets to corresponding source IP address, source port number, and destination port number of a DFR, then one or more packets are generated by the NAT processing module, each having a private IP address, also associated with the DFR, and transmitted 646 to the GGSN 615 or portion thereof For example, the packets received from the server 630 may be transformed into one or more packets to be transmitted 646 by modifying packet identifiers in accordance with the DFR. A PDP context activation is also initiated, for example in response to transmission 646, the PDP context activation associated with the private IP address and/or on a mobile equipment identifier such as an APN associated with the private IP address. The association may be stored for example in a memory module of the NAT 625 and/or DHCP server 620.

The PDP context activation may comprise, for example, steps 648 to 658, as illustrated in FIG. 6. For example, the GGSN 615 may contact 648 the DHCP 620 to verify and/or renew a lease associated with the private IP address, triggering response 650. Additionally, if required, the GGSN may transmit a notification 652 of PDP context activation to the SGSN 610, which may in turn forward notification 654 of the PDP context activation to the mobile device 605. The mobile device and SGSN may also respond 656, 658 to the notifications.

The packets transmitted by the NAT in step 646 may be forwarded 660 by the GGSN through the second network to the target mobile device 605. The forwarded packets may contain at least a portion of the push data. Alternatively, these packets may contain a notification of pending push data, triggering the target mobile device 605 to contact the server 630 or 635 to initiate push communication retrieval (not shown).

Example 5

Figure 7:
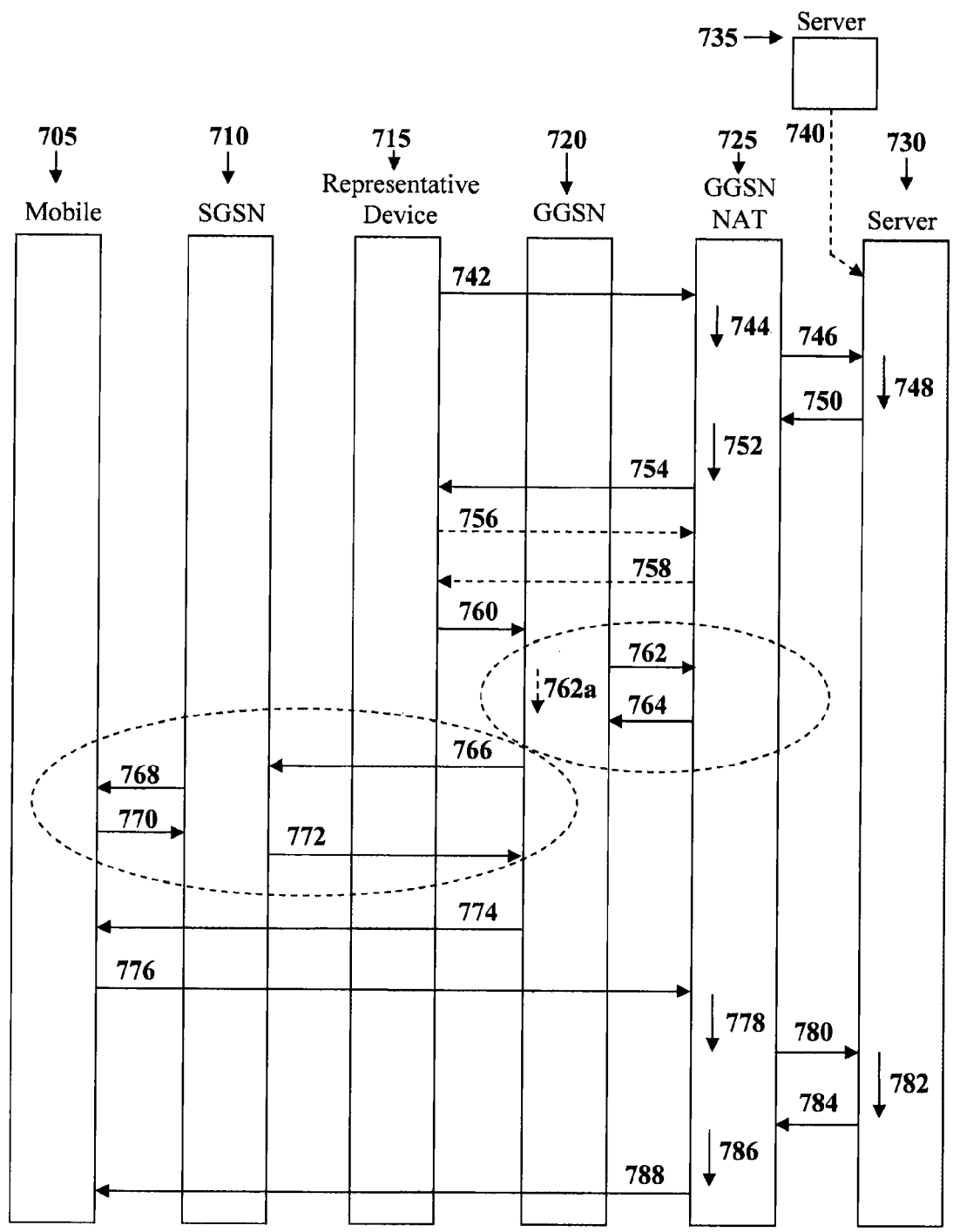
FIG. 7 illustrates a sequence diagram for providing push communication from a server to a mobile device, in accordance with embodiments of the invention.

FIG. 7 illustrates a sequence diagram for providing push communication from a server 730 to a target mobile device 705, in accordance with an embodiment of the present invention using a representative device 715. For example, the devices in the illustrated sequence diagram may relate to the network illustrated in FIG. 4. It is assumed that the target mobile device 705 and representative device 715 have previously obtained private IP addresses and registered with the server 730, for example in accordance with the sequence diagram illustrated in FIG. 5. The push data may optionally be provided 740 to server 730 by another server 735.

The representative device 715 is configured as an interface module to periodically transmit 742 queries addressed to the server 730 on behalf of plural mobile devices, including target mobile device 705. The NAT 725 receives and processes 744 the queries and forwards 746 them to the server 730 according to a DFR, the processing 744 comprising configuring the NAT to accept and forward timely responses to the queries from the server 730 back to the representative device 715. The representative device transmits and receives communication via a network interface operatively coupled to the network on one side of the NAT 725. The server processes 748 the queries and responds 750 with one or more query response messages, each query response message comprising an indication of one or more devices of the second network for which push communication is pending, for example target mobile device 705. The NAT 725 processes 752 and forwards 754 the query response message to the representative device 715 in accordance with a DFR, as previously described.

In response to forwarding 754 of the query response message, the representative device may be configured to transmit a notification message to the mobile device 705, indicative of a push communication pending therefor. Transmission of the notification may trigger or occur substantially concurrently with initiation of a PDP context activation associated with the target mobile device 705. The notification message may represent a transformation of at least a portion of the query response message.

The representative device may be configured to initiate a PDP context activation associated with the target mobile device 705. The PDP context activation may comprise, for example, steps 760 to 772, as illustrated in FIG. 7. For example, the representative device 715 may contact 760 the GGSN, or associated device, to initiate a PDP context activation based on an identifier of the mobile device 705, such as a private IP address or APN associated therewith. The GGSN may contact 762 the NAT to determine or verify an association between private IP address and other identifier, such as APN, for example, which is returned in response 764. The GGSN may perform other operations 762a associated with PDP context activation, for example contacting a DHCP server (not shown) to verify and/or renew a lease associated with the private IP address.

In some embodiments, step 760 comprises transmitting a notification of pending push communications to the GGSN for forwarding to the target mobile device 705 once the appropriate PDP context activation operations have completed.

If required, the GGSN may transmit a notification 766 of PDP context activation to the SGSN 710, which may in turn forward notification 768 of the PDP context activation to the mobile device 705. The mobile device and SGSN may also respond 770, 772 to the said notifications, as appropriate.

Following PDP context activation, the GGSN 720 may forward 774 a notification of pending push communications to the target mobile device 705. The notification may be transmitted by the representative device 715, addressed to the private IP address of the mobile device and forwarded through the private network as would be readily understood by a worker skilled in the art. In response to the notification 774, the mobile device 705 may be configured to transmit a push communication retrieval message 776 addressed to the server 730, or other appropriate server. The NAT 725 is configured to receive the push communication retrieval message and establish a DFR 778 or use an existing DFR, if appropriate, to forward 780 the message to the server 730. The server is configured to process 782 and respond 784 to the push communication retrieval message with packets comprising push data. The NAT 725 is configured to process 786 and forward 788 the packets comprising push data to the mobile device 705 in accordance with the previously established DFR.

Example 6

Figure 8:
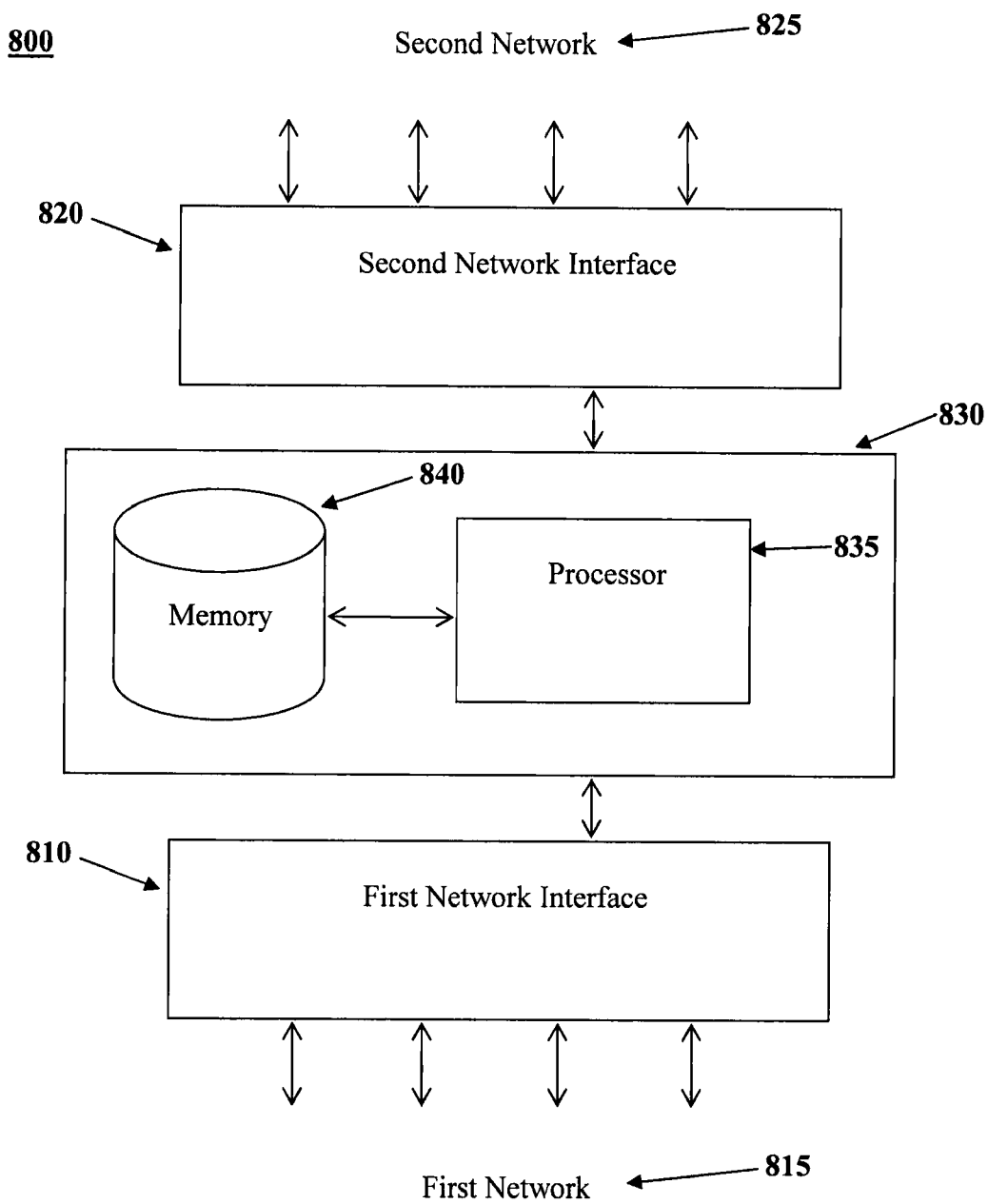
FIG. 8 illustrates an apparatus for forwarding push data from first network to a second network in accordance with an embodiment of the present invention.

FIG. 8 illustrates an apparatus 800 for forwarding push data from first network to a second network in accordance with an embodiment of the present invention. The apparatus 800 comprises a first network interface 810 operatively coupled to a first network 815. The first network interface 810 may comprise plural physical interfaces for facilitating concurrent connection to plural devices of the first network 815, such as servers for reception of data therefrom, and also in some embodiments for transmission of data thereto. Data may include both data packets and control packets, for example. The physical connection may be a wired, optical, wireless, or other connection. Information exchange may proceed in accordance with one or more appropriate communication standards, such as standards of one or more OSI layers, as would be readily understood by a worked skilled in the art. The first network interface 810 may further comprise memory, such as one or more FIFO or priority queues, as well as interface control hardware, software, and/or firmware for facilitating operation of the first network interface 810. The first network interface 810 is configured to receive first data packets from the first network.

The apparatus 800 also comprises a second network interface 820 operatively coupled to a second network 825. The second network interface 820 may comprise plural physical interfaces for facilitating concurrent connection to plural devices of the second network 825, such as mobile devices, for transmission of data thereto, and in some embodiments also for reception of data therefrom. Data may include both data packets and control packets, for example. The physical connection may be a wired, optical, wireless, or other connection. Information exchange may proceed in accordance with one or more appropriate communication standards, such as standards of one or more OSI layers, as would be readily understood by a worked skilled in the art. The second network interface 820 may further comprise memory, such as one or more FIFO or priority queues, as well as interface control hardware, software, and/or firmware for facilitating operation of the second network interface 820. The second network interface is configured to transmit second data packets to the second network. In some embodiments, the apparatus is configured to dispose the packet service network into a state facilitating forwarding of the one or more second data packets to a device associated with the second destination address, for example by initiating a PDP context operation due to transmission of packets from the second network interface.

The apparatus 800 also comprises a processing module 830 operatively coupled to the first network interface 810 and the second network interface 820. The processing module as illustrated comprises a processor 835 such as one or more microprocessors, the processor 835 operatively coupled to memory 840 such as solid state memory. The processing module 830 may also comprise other components, such as one or more memory arrays (not illustrated) configured for enqueueing packets. The memory array, if present, is operatively coupled to the processor 835 which may modify packet information, such as addresses or port numbers thereof. Alternatively, equivalent electronic, optronic, or electro-optical components may be provided. Alternatively, the processor 830 may operate on packets enqueued in the first network interface 810 or second network interface 820. Memory 840 may contain DFRs and software or instructions for operating the apparatus. In some embodiments, the processor 835 may implement DFRs held in the memory 840, and may modify said DFRs as appropriate. The processing module 830 is configured at least to process data packets received from the first network interface 810 and to transform first data packets into second data packets for transmission by the second network interface 820 as described herein in accordance with a DFR, as appropriate. The processing module 830 may also be configured to process data packets received from the second network interface 820, and to transmit processed data packets based thereon via the first network interface 810 as described herein, as appropriate.

Example 7

Figure 9:
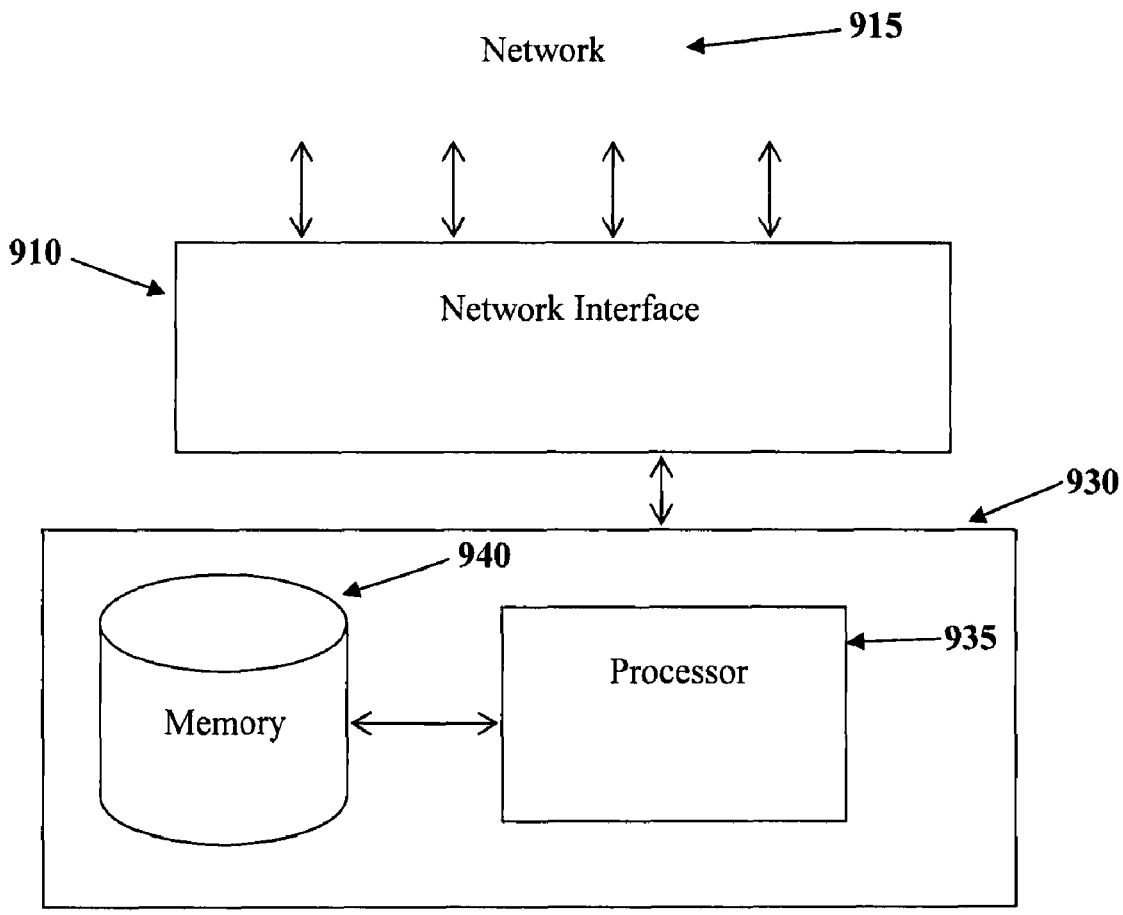
FIG. 9 illustrates an apparatus for facilitating push communication from a first network to a second network in accordance with an embodiment of the present invention.

FIG. 9 illustrates an apparatus 900 for facilitating push communication from a first network to a second network in accordance with an embodiment of the present invention. The first network and the second network are communicatively coupled via a boundary device such as a NAT or an apparatus 800 as illustrated in FIG. 8, the boundary device configured to pass incoming communication from the first network to the second network only if said incoming communication is in response to a corresponding outgoing communication from the second network to the first network. The apparatus 900 comprises a network interface 910 operatively coupled to a network 915, such as one of the first network or second network. The apparatus may communicate with the other of the first network or second network by communicating with the boundary device operatively coupled thereto. The network interface 910 may comprise plural physical interfaces for facilitating concurrent connection to plural devices of the second network 915, such as servers for reception of data therefrom, and also in some embodiments for transmission of data thereto. Data may include both data packets and control packets, for example. The physical connection may be a wired, optical, wireless, or other connection. Information exchange may proceed in accordance with one or more appropriate communication standards, such as standards of one or more OSI layers, as would be readily understood by a worked skilled in the art. The network interface 910 may further comprise memory, such as one or more FIFO or priority queues, as well as interface control hardware, software, and/or firmware for facilitating operation of the network interface 910. The network interface 910 is configured to transmit and receive data packets to and from the network 915.

The apparatus 900 also comprises a processing module 930 operatively coupled to the network interface 910. The processing module as illustrated comprises a processor 935 such as one or more microprocessors, the processor 935 operatively coupled to memory 940 such as solid state memory. The processing module 930 may also comprise other components, such as one or more memory arrays (not illustrated) configured for enqueueing packets. The memory array, if present, is operatively coupled to the processor 935 which may modify packet information, such as addresses or port numbers thereof, or generate packets destined for the second network based on information contained in received packets. Alternatively, equivalent electronic, optronic, or electro-optical components may be provided. Memory 940 may contain software or instructions for operating the apparatus, which may be modified as appropriate.

In some embodiments, the apparatus 900 is configured as a representative device, with the network 915 being the second network. In these embodiments, the processing module 930 may be configured to perform query operations such as scheduling and generating query packets addressed to a server of the first network, query response operations such as processing query response packets to determine addresses of devices indicated in the query response messages, and notification operations, such as generating notification packets to be transmitted by the network interface, and the like, in accordance with operation of a representative device as described herein. In some embodiments, the apparatus 900, configured as a representative device, is configured to dispose the packet service network into a state facilitating forwarding of the one or more second data packets to a device associated with the second destination address, for example by initiating a PDP context operation due to transmission of packets from the network interface 910.

In some embodiments, the apparatus 900 is configured as a server, with the network 915 being the first network. The apparatus so configured and residing in the first network may be configured to receive and store push communications or indications thereof via the first network interface 910, and, using the processing module 930 retain, in memory, a list indicative of one or more devices associated with the second network for which push communication is pending and transmit a query response message in response to the query message transmitted thereto, the query response message comprising an indication of one or more devices associated with the second network for which push communication is pending, as described herein.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for facilitating push communication from a first network to a target device associated with a second network, the second network comprising a packet service network, the method comprising the steps of:
   a) retaining a private address for the target device, the private address usable for facilitating communication with the target device from within the second network when the packet service network is disposed in an activated state with respect to the target device; and
   b) upon receipt of a first message from the first network:
      i. determining if the first message is indicative of a push communication from the first network to the target device; and
      ii. if the first message is determined to be indicative of the push communication from the first network to the target device: initiating an activation operation associated with the packet service network, the activation operation configured to dispose the packet service network into the activated state with respect to the target device; creating, based on the first message, a second message indicative of the push communication to the target device, the second message addressed to the private address; and transmitting the second message from within the second network.

2. The method according to claim 1, wherein the packet service network is a GPRS core network, and wherein the activation operation comprises a PDP context activation.

3. The method according to claim 1, wherein the first network is a public network and the second network is a private network operatively coupled to the public network via a NAT.

4. The method according to claim 1, wherein the private address is retained in accordance with a DHCP lease, the DHCP lease configured to persist when the packet service network is disposed in an unactivated state with respect to the target device.

5. The method according to claim 4, wherein the target device is configured to renew the DHCP lease before expiry thereof.

6. The method according to claim 1, further comprising the step of:
   a) retaining a list of one or more data forwarding rules (DFRs), each DFR having a first portion indicative of at least: a source address, a source port number and a destination port number, the source address, source port number and destination port number associated with the first network, each DFR having a second portion indicative of at least a destination address associated with the second network, the second portion of each DFR being associated with the first portion of the same DFR;
   wherein determining if the first message is indicative of push communication from the first network to the target device comprises determining if a first source address, a first source port number and a first destination port number, each associated with the first message, collectively correspond to the first portion of a DFR in the list of one or more DFRs, the second portion of said DFR indicative of the private address.

7. The method according to claim 6, wherein the first message comprises one or more first data packets, the second message comprises one or more second data packets, and creating the second message comprises transforming the one or more first data packets into the one or more second data packets, each of the one or more second data packets comprising a destination address corresponding to the private address.

8. The method according to claim 7, wherein transforming the one or more first data packets into the one or more second data packets comprises transforming packet identifiers of the one or more first data packets into packet identifiers determined in accordance with the DFR.

9. The method according to claim 6, wherein the list of DFRs is configured to facilitate passing incoming communication from the first network to the second network only if said incoming communication is in response to a corresponding outgoing communication from the second network to the first network.

10. The method according to claim 1, wherein the first network and the second network are communicatively coupled via a boundary device, the method further comprising the step of:
    a) transmitting a query message to a first device via the boundary device, the first device associated with the first network, the first device configured to:
       i. retain a list indicative of one or more devices associated with the second network for which push communication is pending; and
       ii. transmit the first message in response to the query message transmitted thereto, the first message comprising an indication of one or more devices associated with the second network for which push communication is pending;
    b) receive the first message via the boundary device;
    wherein determining if the first message is indicative of a push communication from the first network to the target device comprises determining if said indication of one or more devices is indicative of the target device; and
    wherein the second message comprises a notification of pending push communication for the target device, the target device configured to contact the first device to retrieve pending push communication therefrom in response to receipt of said notification.

11. The method according to claim 10, wherein the first message comprises one or more first data packets, wherein said indication of one or more devices associated with the second network for which push communication is pending resides in one or more payloads of said one or more first data packets.

12. The method according to claim 10, wherein said indication of one or more devices associated with the second network for which push communication is pending comprises one or more indications of private addresses associated with one or more devices for which push communication is pending.

13. The method according to claim 10, wherein creating the second message comprises creating one or more second data packets addressed to the private address, the one or more second data packets configured to initiate a predetermined push message retrieval routine at the target device, the one or more second data packets indicative of an address of the first device.

14. An apparatus for facilitating push communication from a first network to a target device associated with a second network, the second network comprising a packet service network, the apparatus comprising:
    a) one or more memory modules configured to retain a private address for the target device, the private address usable for facilitating communication with the target device from within the second network when the packet service network is disposed in an activated state with respect to the target device; and b) an interface module operatively coupled to at least one of the one or more memory modules, the interface module comprising one or more network interfaces configured to communicatively couple the interface module to one or more of the first network and the second network, and a processing module operatively coupled to at least one of the one or more network interfaces, the interface module configured to:
  i. receive, using one of the one or more network interfaces, a first message from the first network;
  ii. determine, using the processing module, if the first message is indicative of a push communication from the first network to the target device; and
  iii. if the first message is determined to be indicative of the push communication from the first network to the target device: initiate, using one of the one or more network interfaces, an activation operation associated with the packet service network, the activation operation configured to dispose the packet service network into the activated state with respect to the target device; create, using the processing module, a second message based on the first message, the second message indicative of the push communication to the target device, the second message addressed to the private address; and transmit the second message using one of the one or more network interfaces.

15. The apparatus according to claim 14, wherein the packet service network is a GPRS core network, and wherein the activation operation comprises a PDP context activation.

16. The apparatus according to claim 14, wherein the first network is a public network and the second network is a private network operatively coupled to the public network via a NAT.

17. The apparatus according to claim 14, the apparatus further comprising a DHCP server associated with at least one of the one or more memory modules, wherein the private address is retained in accordance with a DHCP lease issued by the DHCP server, the DHCP lease configured to persist when the packet service network is disposed in an unactivated state with respect to the target device.

18. The apparatus according to claim 17, wherein the target device is configured to renew the DHCP lease before expiry thereof.

19. The apparatus according to claim 14, wherein at least one of the one or more memory modules is configured to retain a list of one or more data forwarding rules (DFRs), each DFR having a first portion indicative of at least: a source address, a source port number and a destination port number, the source address, source port number and destination port number associated with the first network, each DFR having a second portion indicative of at least a destination address associated with the second network, the second portion of each DFR being associated with the first portion of the same DFR;
  wherein the processing module is configured to determine if the first message is indicative of the push communication from the first network to the target device at least in part by determining if a first source address, a first source port number and a first destination port number, each associated with the first message, collectively correspond to the first portion of a DFR in the list of one or more DFRs, the second portion of said DFR indicative of the private address.

20. The apparatus according to claim 19, wherein the first message comprises one or more first data packets, the second message comprises one or more second data packets, and the processing module is configured to create the second message at least in part by transforming the one or more first data packets into the one or more second data packets, each of the one or more second data packets comprising a destination address corresponding to the private address.

21. The apparatus according to claim 20, wherein the processing module is configured to transform the one or more first data packets into the one or more second data packets at least in part by transforming packet identifiers of the one or more first data packets into packet identifiers determined in accordance with the DFR.

22. The apparatus according to claim 19, wherein the list of DFRs is configured to facilitate passing incoming communication from the first network to the second network only if said incoming communication is in response to a corresponding outgoing communication from the second network to the first network.

23. The apparatus according to claim 19, wherein the apparatus is configured at least in part as a NAT, the apparatus comprising a first network interface operatively coupled to the first network and a second network interface operatively coupled to the second network.

24. The apparatus according to claim 14, wherein the first network and the second network are communicatively coupled via a boundary device, the apparatus further configured to:
  a) transmit, using one of the one or more network interfaces, a query message to a first device, the first device associated with the first network, the query message transmitted via the boundary device, the first device configured to:
    i. retain a list indicative of one or more devices associated with the second network for which push communication is pending; and
    ii. transmit the first message in response to the query message transmitted thereto, the first message comprising an indication of one or more devices associated with the second network for which push communication is pending;
  b) receive the first message via the boundary device;
  wherein the processing module is configured to determine if the first message is indicative of the push communication from the first network to the target device at least in part by determining if said indication of one or more devices is indicative of the target device; and wherein the second message comprises a notification of pending push communication for the target device, the target device configured to contact the first device to retrieve pending push communication therefrom in response to receipt of said notification.

25. The apparatus according to claim 24, wherein the boundary device operates at least in part as a NAT operatively coupling the first network and the second network, the boundary device configured to facilitate passing incoming communication from the first network to the second network only if said incoming communication is in response to a corresponding outgoing communication from the second network to the first network.

26. The apparatus according to claim 24, wherein the apparatus is a representative device, the apparatus having a first network interface operatively coupled to the second network, the apparatus operatively coupled to the first network via the first network interface and the boundary device.

27. The apparatus according to claim 26, wherein the representative device is a mobile device.

28. The apparatus according to claim 24, wherein the first message comprises one or more first data packets, wherein said indication of one or more devices associated with the second network for which push communication is pending resides in one or more payloads of said one or more first data packets.

29. The apparatus according to claim 24, wherein said indication of one or more devices associated with the second network for which push communication is pending comprises one or more indications of private addresses associated with one or more devices for which push communication is pending.

30. The apparatus according to claim 24, wherein the processing module is configured to create the second message at least in part by creating one or more second data packets addressed to the private address, the one or more second data packets configured to initiate a predetermined push message retrieval routine at the target device, the one or more second data packets indicative of an address of the first device.

31. A non-transitory computer program product comprising a memory having embodied thereon statements and instructions for execution by a computer, thereby causing the computer to perform a method for facilitating push communication from a first network to a target device associated with a second network, the second network comprising a packet service network, the method comprising the steps of:
   a) retaining a private address for the target device, the private address usable for facilitating communication with the target device from within the second network when the packet service network is disposed in an activated state with respect to the target device; and
   b) upon receipt of a first message from the first network:
      i. determining if the first message is indicative of a push communication from the first network to the target device; and
      ii. if the first message is determined to be indicative of the push communication from the first network to the target device: initiating an activation operation associated with the packet service network, the activation operation configured to dispose the packet service network into the activated state with respect to the target device; creating, based on the first message, a second message indicative of the push communication to the target device, the second message addressed to the private address; and transmitting the second message from within the second network.

* * * * *